(12) United States Patent
Arkus et al.

(10) Patent No.: US 11,799,151 B1
(45) Date of Patent: Oct. 24, 2023

(54) VEHICLE BATTERY CELL COOLING ASSEMBLY

(71) Applicant: Moog Inc., East Aurora, NY (US)

(72) Inventors: Alan J. Arkus, Cincinnati, OH (US); Timothy D. Abbott, Orchard Park, NY (US)

(73) Assignee: Moog Inc., East Aurora, NY (US)

(*) Notice: Subject to any disclaimer, the term of this patent is extended or adjusted under 35 U.S.C. 154(b) by 234 days.

(21) Appl. No.: 17/407,417

(22) Filed: Aug. 20, 2021

Related U.S. Application Data

(60) Provisional application No. 63/129,177, filed on Dec. 22, 2020, provisional application No. 63/068,330, filed on Aug. 20, 2020.

(51) Int. Cl.
*H01M 10/613* (2014.01)
*H01M 10/625* (2014.01)
(Continued)

(52) U.S. Cl.
CPC ..... *H01M 10/6568* (2015.04); *H01M 10/613* (2015.04); *H01M 10/625* (2015.04);
(Continued)

(58) Field of Classification Search
CPC ........... H01M 10/6568; H01M 10/613; H01M 10/625; H01M 10/643; H01M 10/6556;
(Continued)

(56) References Cited

U.S. PATENT DOCUMENTS 5,158,841 A * 10/1992 Mennicke ........... H01M 10/615
220/592.2
7,147,963 B2 * 12/2006 Kimoto ............... H01M 50/289
429/152
(Continued)

FOREIGN PATENT DOCUMENTS

CN 101552351 A * 10/2009 .......... H01M 10/613
CN 104810569 A * 7/2015 .......... H01M 10/482
(Continued)

*Primary Examiner* — Kaity V Chandler
(74) *Attorney, Agent, or Firm* — Harter Secrest & Emery LLP

(57) ABSTRACT

A battery cell cooling assembly for a vehicle comprising a cooling vessel having a coolant flow path between an inlet and outlet, cell apertures exterior to the flow path, a first directional directing coolant from the inlet into laterally spaced first sub-channels, a second directional receiving coolant from the first sub-channels and directing it into laterally spaced second sub-channels, the first sub-channels extending transversely between the cell apertures and aligned longitudinally between first aperture ends and second aperture ends of the cell apertures, the second sub-channels extending transversely between the cell apertures and aligned longitudinally between the first sub-channels and the second aperture ends, wherein the first sub-channels provide a first thermal pass by each of the plurality of cell apertures and the second sub-channels provide a second thermal pass by each of the same plurality of cell apertures for temperature control of the cells during operation.

21 Claims, 16 Drawing Sheets

(51) Int. Cl.
  *H01M 10/643*  (2014.01)
  *H01M 10/651*  (2014.01)
  *H01M 10/6557*  (2014.01)
  *H01M 10/656*  (2014.01)
  *H01M 10/6568*  (2014.01)
  *H01M 50/213*  (2021.01)
  *H01M 50/249*  (2021.01)
  *H01M 10/6556*  (2014.01)
  *H01M 50/242*  (2021.01)

(52) U.S. Cl.
  CPC ..... *H01M 10/643* (2015.04); *H01M 10/6556* (2015.04); *H01M 50/213* (2021.01); *H01M 50/242* (2021.01); *H01M 50/249* (2021.01); *H01M 2220/20* (2013.01)

(58) Field of Classification Search
  CPC ............. H01M 50/213; H01M 50/242; H01M 50/249; H01M 2220/20
  See application file for complete search history.

(56) References Cited

U.S. PATENT DOCUMENTS

| | | | |
|---|---|---|---|
| 8,647,763 B2 | 2/2014 | Tennessen et al. | |
| 9,230,748 B1 | 1/2016 | Semrau et al. | |
| 10,252,628 B2 | 4/2019 | Gebhart | |
| 10,252,629 B2 | 4/2019 | Gebhart | |
| 10,374,272 B1* | 8/2019 | Dellon | H01M 50/213 |
| 11,283,121 B1* | 3/2022 | Boecker | H01M 50/249 |
| 2005/0170240 A1* | 8/2005 | German | B60L 50/66 |
| | | | 429/120 |
| 2005/0170241 A1* | 8/2005 | German | H01M 10/663 |
| | | | 429/120 |
| 2006/0078789 A1* | 4/2006 | Wegner | H01M 10/6557 |
| | | | 429/120 |
| 2008/0292945 A1* | 11/2008 | Kumar | H01M 10/658 |
| | | | 429/120 |
| 2008/0311468 A1 | 12/2008 | Hermann et al. | |
| 2008/0318118 A1* | 12/2008 | Ghosh | H01M 50/213 |
| | | | 429/88 |
| 2009/0061305 A1* | 3/2009 | Nishida | H01M 10/652 |
| | | | 429/164 |
| 2009/0148754 A1* | 6/2009 | Marchio | H01M 10/6555 |
| | | | 429/83 |
| 2010/0035139 A1* | 2/2010 | Ghosh | H01M 50/213 |
| | | | 429/120 |
| 2010/0116570 A1* | 5/2010 | Sugawara | H01M 50/35 |
| | | | 429/82 |
| 2010/0143782 A1* | 6/2010 | Kruger | H01M 10/6557 |
| | | | 429/120 |
| 2012/0003522 A1* | 1/2012 | Fuhr | H01M 10/6551 |
| | | | 429/120 |
| 2015/0044519 A1* | 2/2015 | Rief | H01M 10/6563 |
| | | | 429/50 |
| 2015/0171485 A1* | 6/2015 | Rawlinson | B60L 50/64 |
| | | | 429/62 |
| 2017/0015397 A1* | 1/2017 | Mitchell | B60P 3/1033 |
| 2018/0145381 A1* | 5/2018 | Dinh | H05K 7/20881 |
| 2018/0254536 A1* | 9/2018 | Chidester | H01M 10/6567 |
| 2018/0337434 A1* | 11/2018 | Burgers | F28F 9/02 |
| 2019/0067763 A1* | 2/2019 | Ing | H01M 10/04 |
| 2019/0081372 A1* | 3/2019 | Capati | H01M 50/516 |
| 2019/0097281 A1* | 3/2019 | Kustosch | F28D 15/046 |
| 2020/0153060 A1* | 5/2020 | Haeusler | H01M 50/211 |
| 2020/0335744 A1* | 10/2020 | Tucker | H01M 10/613 |
| 2020/0339010 A1* | 10/2020 | Villanueva | B64D 27/24 |
| 2020/0343514 A1* | 10/2020 | Fees | H01M 2/206 |
| 2021/0066767 A1* | 3/2021 | Gao | H01M 50/209 |
| 2021/0104788 A1* | 4/2021 | Shao | H01M 10/613 |
| 2022/0029221 A1* | 1/2022 | Muller | H01M 10/643 |

FOREIGN PATENT DOCUMENTS

| | | | | |
|---|---|---|---|---|
| CN | 108028325 A | | 5/2018 | |
| EP | 3595078 A1 | | 1/2020 | |
| ES | 1070627 U | * | 10/2009 | ......... H01M 10/613 |
| FR | 3078149 A1 | | 8/2019 | |
| WO | WO-2013131588 A2 | * | 9/2013 | ............. B25F 5/008 |
| WO | WO-2013139409 A1 | * | 9/2013 | ......... H01M 10/613 |
| WO | WO-2018150279 A1 | * | 8/2018 | ............. H01G 11/10 |
| WO | WO-2019206409 A1 | * | 10/2019 | ......... H01M 10/613 |
| WO | WO-2020058693 A1 | * | 3/2020 | ......... H01M 10/425 |

\* cited by examiner

VEHICLE BATTERY CELL COOLING ASSEMBLY

TECHNICAL FIELD

The present disclosure relates generally to the field of battery cooling, and more particularly to an improved battery cell cooling assembly.

BACKGROUND ART

Rechargeable batteries or cells, such as lithium-ion cells, for electric vehicles can be susceptible to thermal runaway, which can occur when more heat is generated by the cell than is being dissipated. This condition can have various potential causes, including without limitation a short circuit, overcharge, exposure to high temperatures, or a crash. The temperature increases in a cell subject to thermal runaway can cascade to adjacent cells within a battery pack unless cooled.

Battery pack cooling systems are known in the prior art. US Patent Application Publication No. 2008/0311468, entitled "Optimized Cooling Tube Geometry for Intimate Thermal Contact with Cells," is directed to a battery pack thermal management system for use in an electric vehicle. U.S. Pat. No. 8,647,763 entitled "Battery Coolant Jacket" is directed to a battery coolant jacket for use with a plurality of cells of an electric vehicle.

BRIEF SUMMARY

With parenthetical reference to corresponding parts, portions or surfaces of the disclosed embodiments, merely for the purposes of illustration and not by way of limitation, an improved battery cell cooling assembly (15) for a vehicle is provided comprising: a cooling vessel (30, 130) having an interior volume (33) and comprising an inlet (31) for receiving a coolant, an outlet (32) for discharging the coolant, and an interior coolant flow path (34) between the inlet (31) and the outlet (32) within the interior volume (33); a plurality of cell apertures (40) arranged laterally (21) and transversely (22) in the cooling vessel exterior to the interior coolant flow path (34); each of the plurality of cell apertures (40) configured to receive a battery cell (18) and extending longitudinally (20) in the cooling vessel from a first aperture end (43) to a second aperture end (44); a first coolant directional (38) in the interior coolant flow path (34) between the inlet (31) and the outlet (32) that is configured to receive coolant from the inlet (31) and to direct the coolant into multiple laterally spaced first sub-channels (46) within the interior coolant flow path (34); a second coolant directional (45) in the interior coolant flow path (34) between the first coolant directional (38) and the outlet (32) and configured to receive coolant from the first sub-channels (46) and to direct the coolant into multiple laterally spaced second sub-channels (48) within the interior coolant flow path (34); the first sub-channels (46) extending transversely between the plurality of cell apertures (40) and aligned longitudinally between the first aperture ends (43) and the second aperture ends (44) of the plurality of cell apertures (40); the second sub-channels (48) extending transversely between the plurality of cell apertures (40) and aligned longitudinally between the first sub-channels (46) and the second aperture ends (44); wherein the first sub-channels (46) provide a first thermal pass (35) by each of the plurality of cell apertures (40) and the second sub-channels (48) provide a second thermal pass (36) by each of the same plurality of cell apertures (40) for temperature control of the cells (18) during operation of the vehicle.

The battery cell cooling assembly may comprise a transversely extending gap (49) aligned longitudinally between the first sub-channels (46) and the second sub-channels (48). The cooling vessel may comprise a top side, a bottom side, a front side, a rear side, a left side and a right side. The inlet (31) and the outlet (32) may be proximate the top side of the cooling vessel, the second coolant directional (45) may be proximate the bottom side of the cooling vessel, and the plurality of cell apertures (40) may extend between the front side and the rear side of the cooling vessel.

Each of the plurality of cell apertures (40) may comprise a tube having a cylindrical inner surface (51) and a cylindrical outer surface (52). The plurality of first sub-channels (46) may be formed at least in part by first portions (52A) of the cylindrical outside surfaces (52) of the tubes, and the plurality of second sub-channels (48) may be formed at least in part by second portions (52B) of the cylindrical outside surfaces of the tubes that are separate from the first portions (52A) of the cylindrical outside surfaces (52) of the tubes. The first portions (52A) of the cylindrical outside surfaces (52) of the tubes and the second portions (52B) of the cylindrical outside surfaces (52) of the tubes may define at least in part the interior volume (33) of the cooling vessel.

The battery cell cooling assembly may comprise a housing enclosure (16) and the cooling vessel may be supported by the housing enclosure (16) via a vibration dampening support (70, 71, 72). The cooling vessel may comprise a left side and the housing enclosure may comprise a left side panel (16C) opposed to the left side of the cooling vessel; either the left side of the cooling vessel or the left side panel (16C) of the housing enclosure (16) may comprise a first support post (71A) and the other of the left side of the cooling vessel or the left side panel of the housing enclosure may comprise a first support recess (70A) configured to receive the first support post (71A); and the vibration dampening support may comprise a first vibration isolation member (72A) disposed between the first support post (71A) and the first support recess (70A); and the cooling vessel may be supported at least in part by the left side panel (16C). The cooling vessel may comprise a right side and the housing enclosure (16) may comprise a right side panel (16D) opposed to the right side of the cooling vessel; either the right side of the cooling vessel or the right side panel (16D) of the housing enclosure may comprise a second support post (71B) and the other of the right side of the cooling vessel or the right side panel of the housing enclosure may comprise a second support recess (70B) configured to receive the second support post (71B); and the vibration dampening support may comprise a second vibration isolation member (72B) disposed between the second support post (71B) and the second support recess (70B); and the cooling vessel may be supported at least in part by the right side panel (16D).

The first sub-channels (46) and the second sub-channels (48) may extend transversely (22) parallel to each other. The plurality of cell apertures (40) may be arranged in a predetermined pattern of laterally (21) spaced columns (53) and transversely (22) spaced rows (54) of the cell apertures (40). The cell apertures in the laterally spaced columns (53) may be laterally offset (55) from the cell apertures in the transversely spaced rows (54). The first sub-channels (46) may curve around the cell apertures (40) in the laterally spaced columns (53). The battery cell cooling assembly may comprise a third coolant directional (39) in the interior coolant flow path between the second coolant directional (45) and the outlet (32) that is configured to receive coolant from the second sub-channels (48) and to direct the coolant into the outlet (32).

The battery cell cooling assembly may comprise a second cooling vessel (130) having a second interior volume and comprising a second inlet (131) for receiving the coolant, a second outlet (132) for discharging the coolant, and a second interior coolant flow path between the second inlet (131) and the second outlet (132) within the second interior volume; a second plurality of cell apertures (140) arranged laterally and transversely in the second cooling vessel (130) exterior to the second interior coolant flow path; each of the second plurality of cell apertures (140) configured to receive a battery cell and extending longitudinally in the second cooling vessel from a third aperture end to a fourth aperture end; a third coolant directional (138) in the second interior coolant flow path between the second inlet (131) and the second outlet (132) that is configured to receive coolant from the second inlet (131) and to direct the coolant into multiple laterally spaced third sub-channels (146) within the second interior coolant flow path; a fourth coolant directional (145) in the second interior coolant flow path between the third coolant directional (138) and the second outlet (132) and configured to receive coolant from the third sub-channels (146) and to direct the coolant into multiple laterally spaced fourth sub-channels (148) within the second interior coolant flow path; the third sub-channels (146) extending transversely (22) between the second plurality of cell apertures (140) and aligned longitudinally (20) between the third aperture ends and the fourth aperture ends of the second plurality of cell apertures (140); the fourth sub-channels (148) extending transversely between the second plurality of cell apertures (140) and aligned longitudinally (20) between the third sub-channels (146) and the fourth aperture ends; wherein the third sub-channels (146) provide a first thermal pass by each of the second plurality of cell apertures (140) and the fourth sub-channels (148) provide a second thermal pass by each of the same second plurality of cell apertures (140). The battery cell cooling assembly may comprise a thermal insulation layer (73) between the cooling vessel (30) and the second cooling vessel (130). The battery cell cooling assembly may comprise a housing enclosure (16) containing the cooling vessel (30) and the second cooling vessel (130) and the cooling vessel (30) and the second cooling vessel (130) may be each supported by the housing enclosure (16) via a vibration dampening support (70, 71, 72). The fourth sub-channels (148) may be spaced longitudinally between the first sub-channels (46) and the third sub-channels (146). The battery cell cooling assembly may comprise a fifth coolant directional (39) in the interior coolant flow path (34) between the second coolant directional (45) and the outlet (32) that is configured to receive coolant from the second sub-channels (48) and to direct the coolant into the outlet (32); and a sixth coolant directional (139) in the second interior coolant flow path between the fourth coolant directional (145) and the second outlet (132) that is configured to receive coolant from the fourth sub-channels (148) and to direct the coolant into the second outlet (132). The battery cell cooling assembly may comprise a system inlet (23) in fluid communication with both the inlet (31) of the cooling vessel (30) and the second inlet (131) of the second cooling vessel (130) and a system outlet (24) in fluid communication with both the outlet (32) of the cooling vessel (30) and the second outlet (132) of the second cooling vessel (130).

DETAILED DESCRIPTION OF THE EMBODIMENTS

Figure 1:
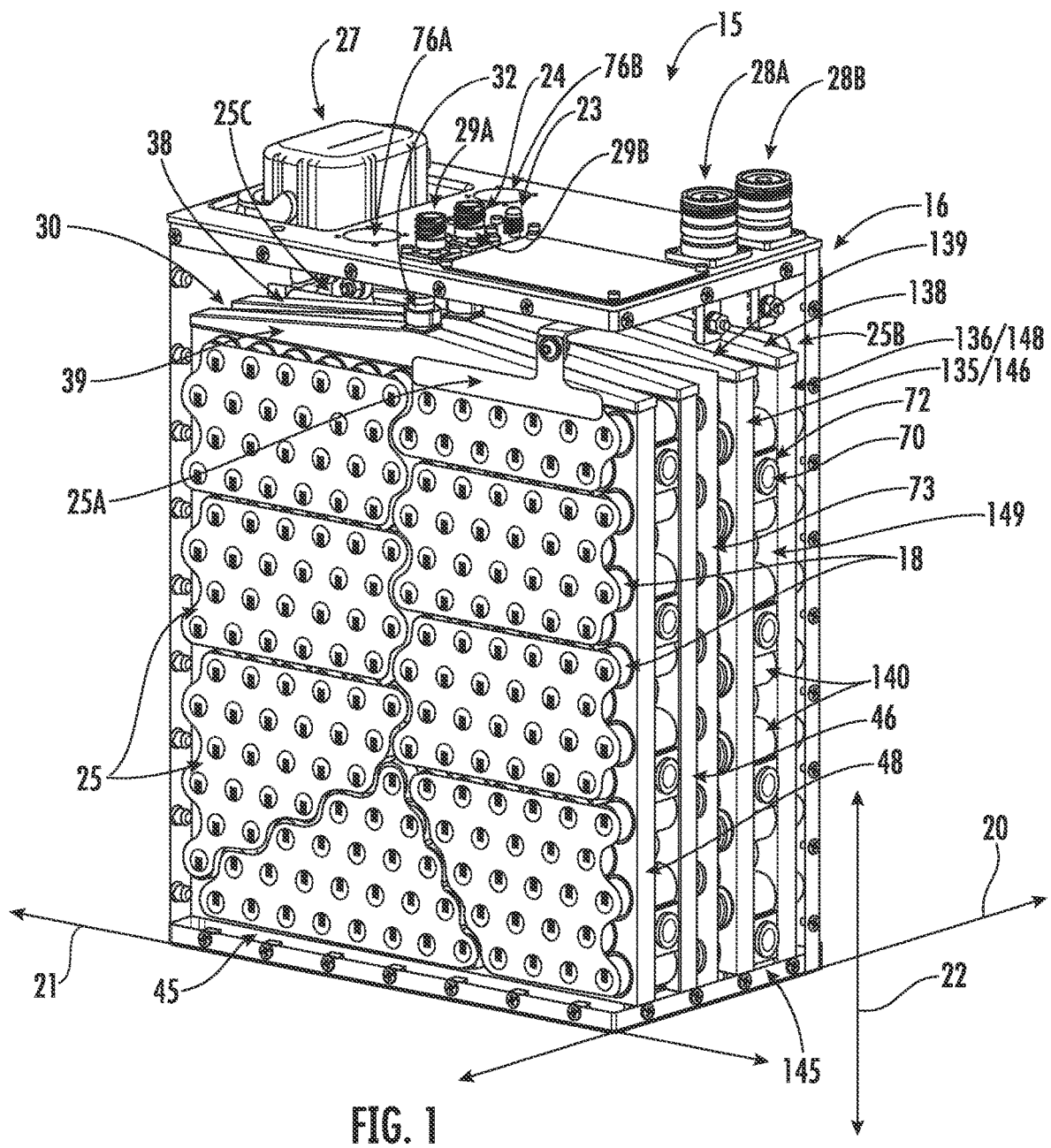
FIG. 1 is a partial cutaway perspective view of a first embodiment of the battery cell cooling assembly.
Figure 2:
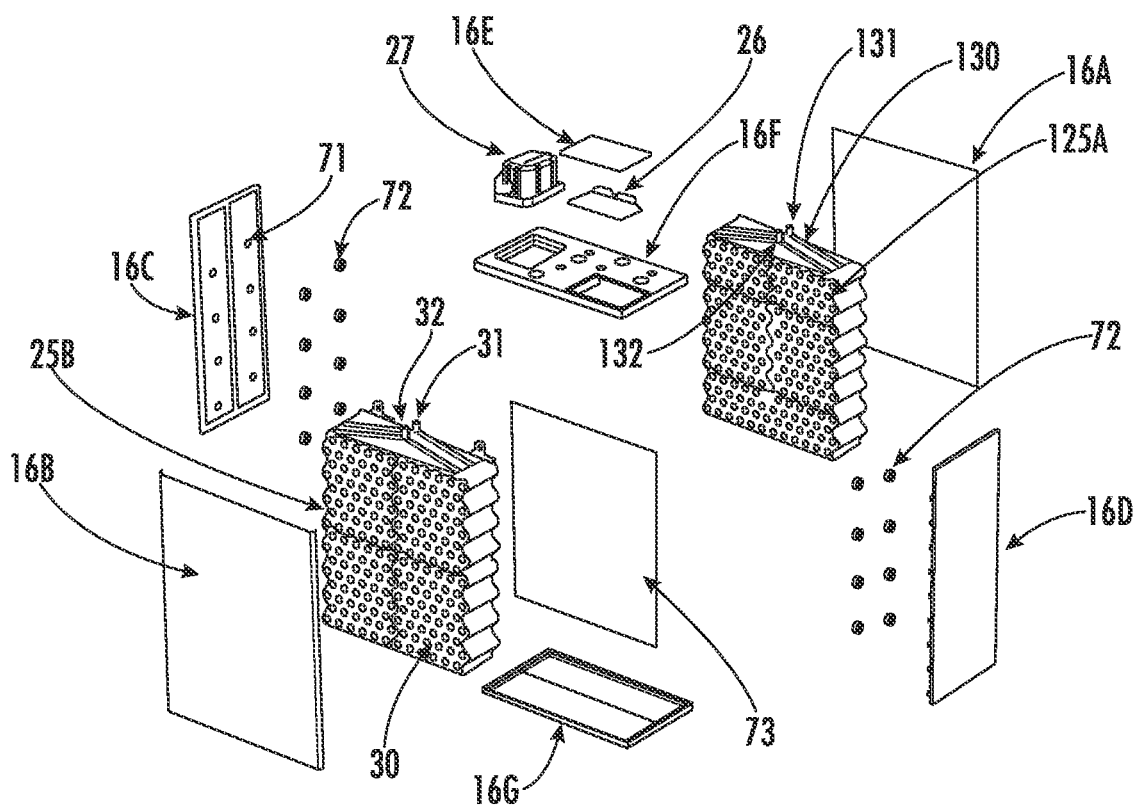
FIG. 2 is a partial exploded view of the assembly shown in FIG. 1.
Figure 3:
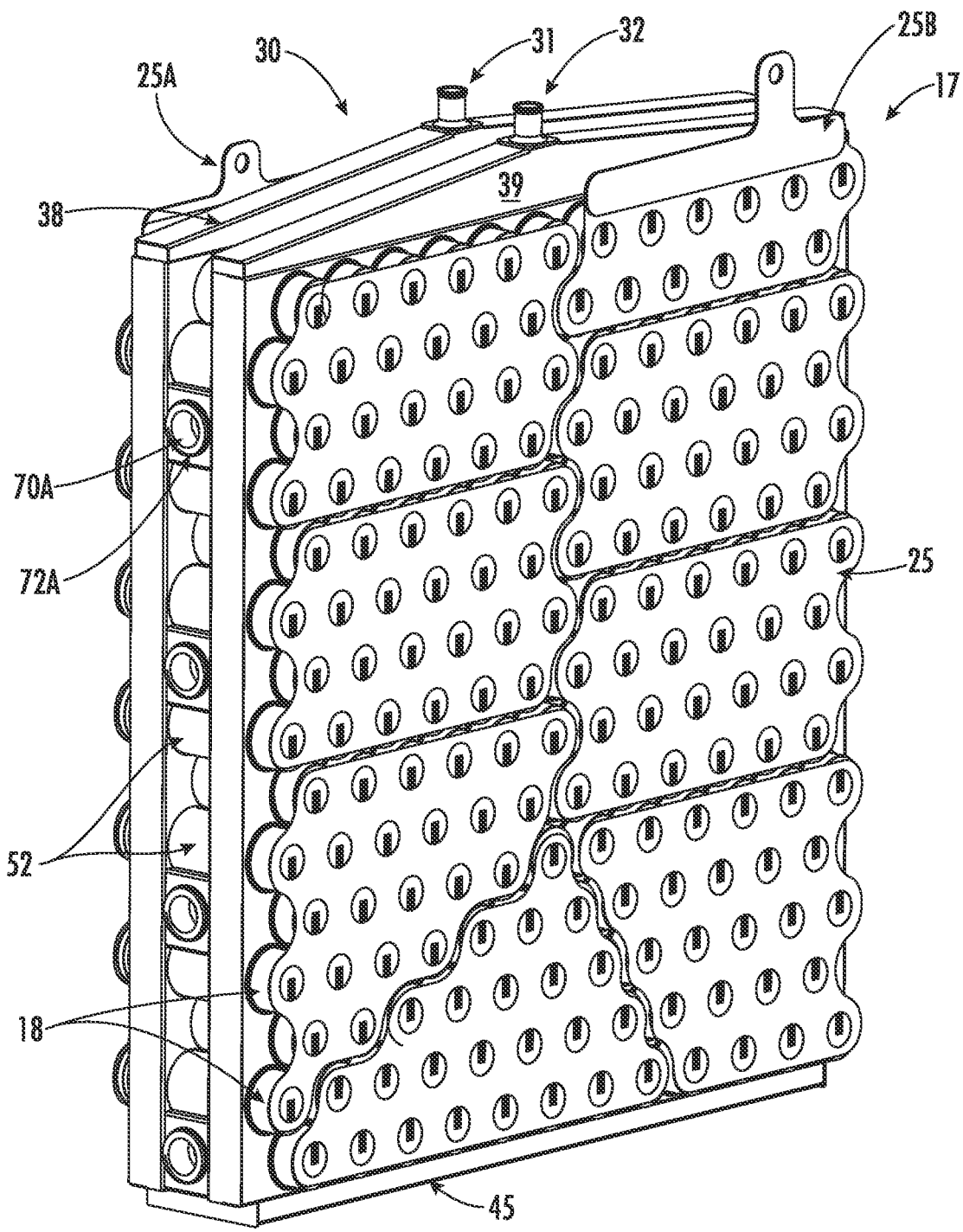
FIG. 3 is a perspective view of one of the cooling blocks, cells, current collectors and bus bars shown in FIG. 1.
Figure 4:
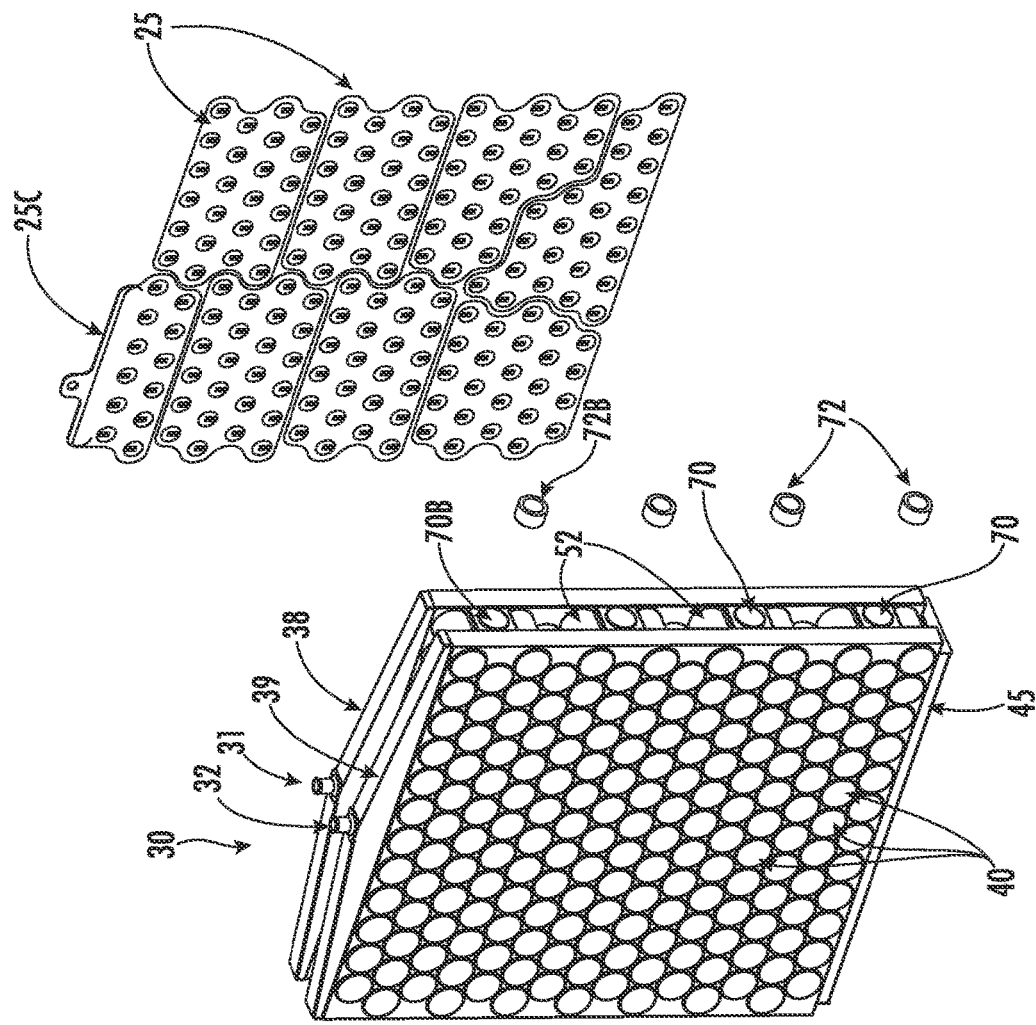
FIG. 4 is a partial exploded view of the cooling block and current collectors and bus bars shown in FIG. 3.
Figure 4:
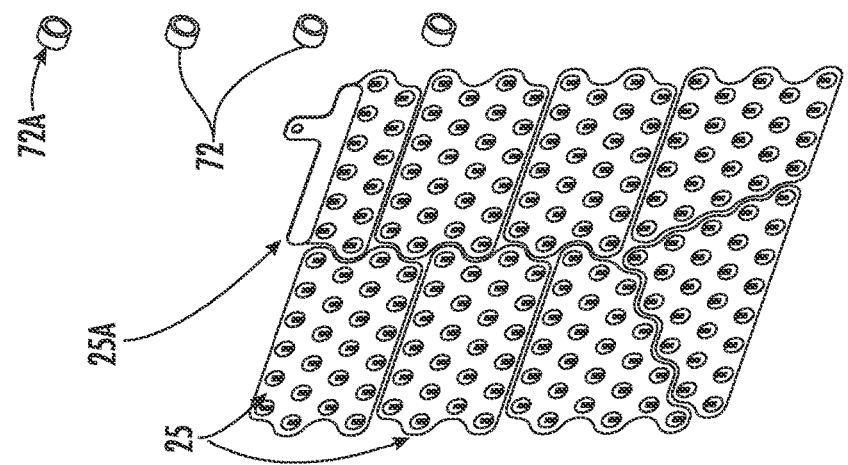

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIG. 1 thereof, the present disclosure broadly provides a high voltage battery pack assembly, of which an embodiment is indicated at 15. Battery pack module 15 is intended for use in electric vehicles, such as for example and without limitation electric construction vehicles, electric boats, spacecraft, electric movable equipment, and electric aircraft. However, battery pack 15 may be used for other purposes and in other applications. As shown, battery pack 15 broadly includes a plurality of cells 18 and 118, which extend longitudinally through apertures 40 and 140 in each of longitudinally stacked cooling blocks 30 and 130 respectively, battery current collectors 25 and bus bars 25A, 25B, 25C and 25D, thermal insulation layer 73 disposed longitudinally between cooling blocks 30 and 130, and battery management system (BMS) circuit board 26, all enclosed in housing 16.

The electrical and fluid connections to module 15 are made on the top face of housing 16 and include external coolant inlet port 23, external coolant outlet port 24, manual service disconnect (MSD) 27, high voltage (HV) connections 28A and 28B, low voltage connections 29A and 29B, and low pressure vent 75. In addition, two burst disk ports may be included that allow for connecting to an aircraft exhaust system to prevent impingement of hot gases on the aircraft fuselage or other sensitive equipment (such as in the event of battery cell thermal runaway).

In this embodiment, module 15 is designed to hold 360 cells in a 30 series/12 parallel configuration. Module 15 is connected to the vehicle high voltage bus by HV single-pole connectors 28A and 28B. Inside housing 16, HV connectors 28A and 28B are bolted to copper bus bars 25A and 25B that are in turn bolted to the positive and negative current collectors 25. Alternatively, bus bars 25A and 25B may be replaced with flexible braided copper jumpers. Similarly, the mid-point bridge between blocks 30 and 130 are attached to MSD 27 via copper bus bars 25C and 25D or braided jumpers. In this embodiment, cells 18 and 118 are connected electrically by nickel current collectors 25 which are resistance welded to the positive and negative terminals in an arrangement with twelve cells in parallel in this embodiment. In this embodiment, each of blocks 30 and 130 has eight current collectors 25 to connect the series string of thirty.

Mid-module MSD 27 houses a 200 Amp fuse and serves as a bridge between blocks 30 and 130. During service and transport, the MSD cover can be removed, and a lock-out cover can be installed to prevent inadvertent short circuit of the high voltage positive and negative connections.

Module-level BMS circuit board 26 is connected to each current collector 25 via discrete wires, which are either soldered or crimped to tabs on them. This enables the BMS to measure voltages of every cell and perform voltage balancing when appropriate. Temperature sensors may also be placed strategically through module 15 to enable the BMS to report any potential cooling system problems such as high temperature gradients within module 15, or between modules. To shield BMS circuit board 26 from electromagnetic interference (EMI) outside module 15, much of enclosure 16 is aluminum with a chromate conversion coating that will resist corrosion while closing the Faraday cage at all panel interfaces. Each panel closure is designed as a labyrinth to help attenuate high frequency noise penetration. Furthermore, inside enclosure 16, BMS board 26 is separated from the larger volume by a smaller enclosure, which is only penetrated by the BMS harness.

Low-pressure vent 75 is positioned next to MSD 27 to prevent buildup of any pressure differential inside enclosure 16 relative to ambient pressure, which may occur for example and without limitation when used in an aircraft as the aircraft altitude changes. This helps prevent high pressure loads on the structure as well as to reduce wicking of moisture into enclosure 16 through electrical connections or other small gaps. If preferred, low-pressure vent 75 may be removed, and the port may be used to connect module 15 to a common atmospheric venting manifold.

Two high-pressure burst disks 76A and 76B are built into top 16F of enclosure 16. Burst disks 76A and 76B are designed to shear, and peel open at a prescribed pressure difference between the inside of module 15 and ambient. Burst disks 76A and 76B are designed to relieve high pressures that might occur in the event of a large thermal runaway event inside enclosure 16, preventing explosion of module 15 and resulting damage to the vehicle, such as for example the airframe of an aircraft. Burst disk ports 76A and 76B may be connected to exhaust tubes to route hot gases away from more sensitive parts of the vehicle, such as for example the airframe of an aircraft.

Housing 16 is a lightweight aluminum enclosure generally comprising front panel 16B, rear panel 16A, left side panel 16C, right panel 16D, bottom panel 16G and top panel 16F with circuit board cover 16E. Housing 16 thereby houses the cells, battery management system, cooling system, and all necessary electrical connections in a compact and robust package. Isolation of the high voltage circuit from module housing 16 may be accomplished in a number of ways. For example, the inside of enclosure 16 may be wrapped in or coated with a high dielectric strength film such as Zirconia Ceramic. While the high voltage conductors should never contact the inside of enclosure 16 under normal circumstances, this will provide an extra measure of safety, such as for example in the event of a hard landing of an aerial vehicle.

Inside the module, battery cells 18 and 118 are housed in two structural cooling blocks 30 and 130. As shown, cooling blocks 30 and 130 are structurally the same. Accordingly, the following description of cooling block 30 applies also to cooling block 130.

Cooling block 30 is a hollow vessel having a plurality of exterior cell apertures 40 and an interior volume 33 configured to distribute coolant flow 34 around every cell 18 in cell aperture 40 to provide a threshold operating temperature gradient. In this embodiment, such threshold is less than three degrees Celsius and a coolant flow rate of approximately one liter per minute is provided, per module.

Figure 5:
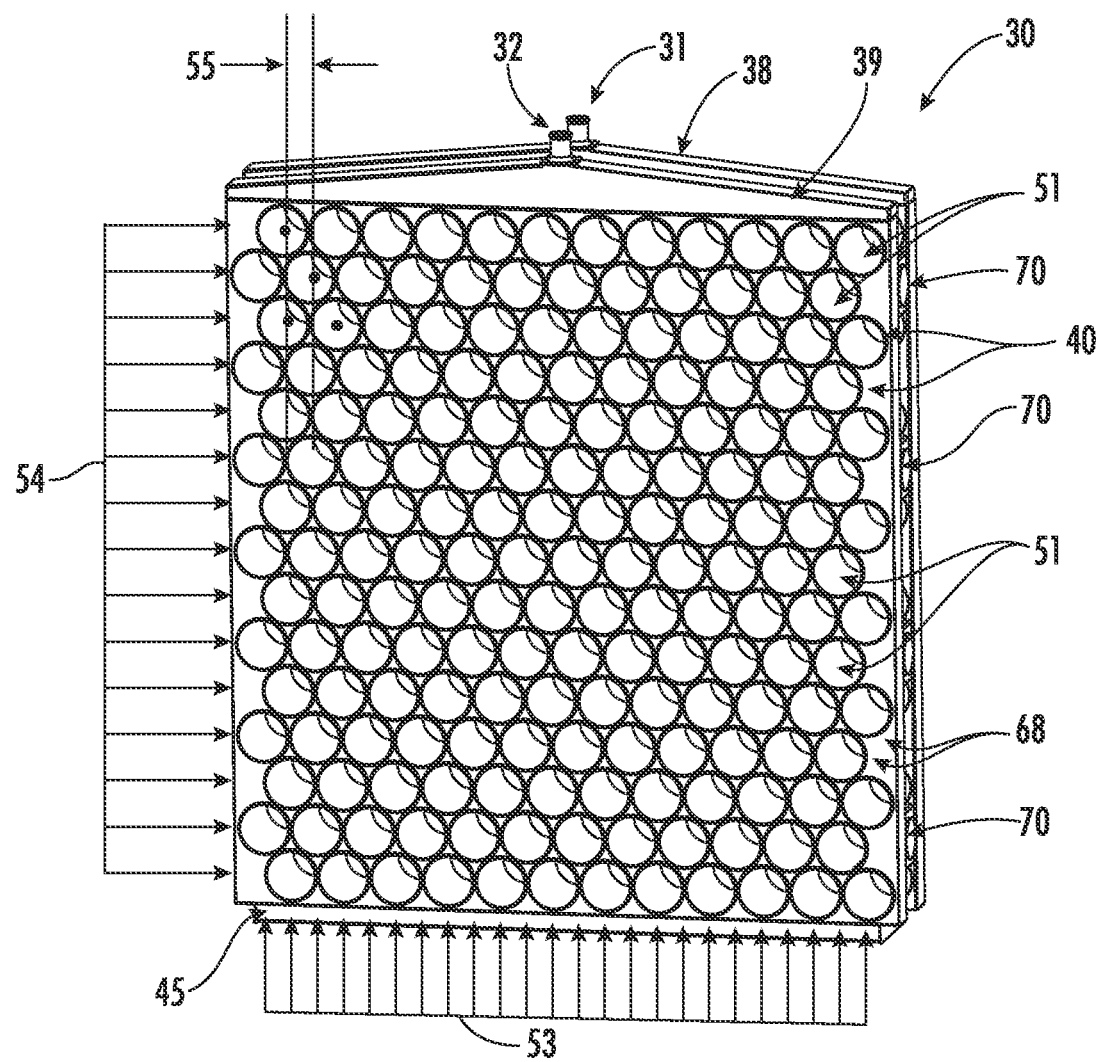
FIG. 5 is a front perspective view of the cooling block shown in FIG. 4.
Figure 6:
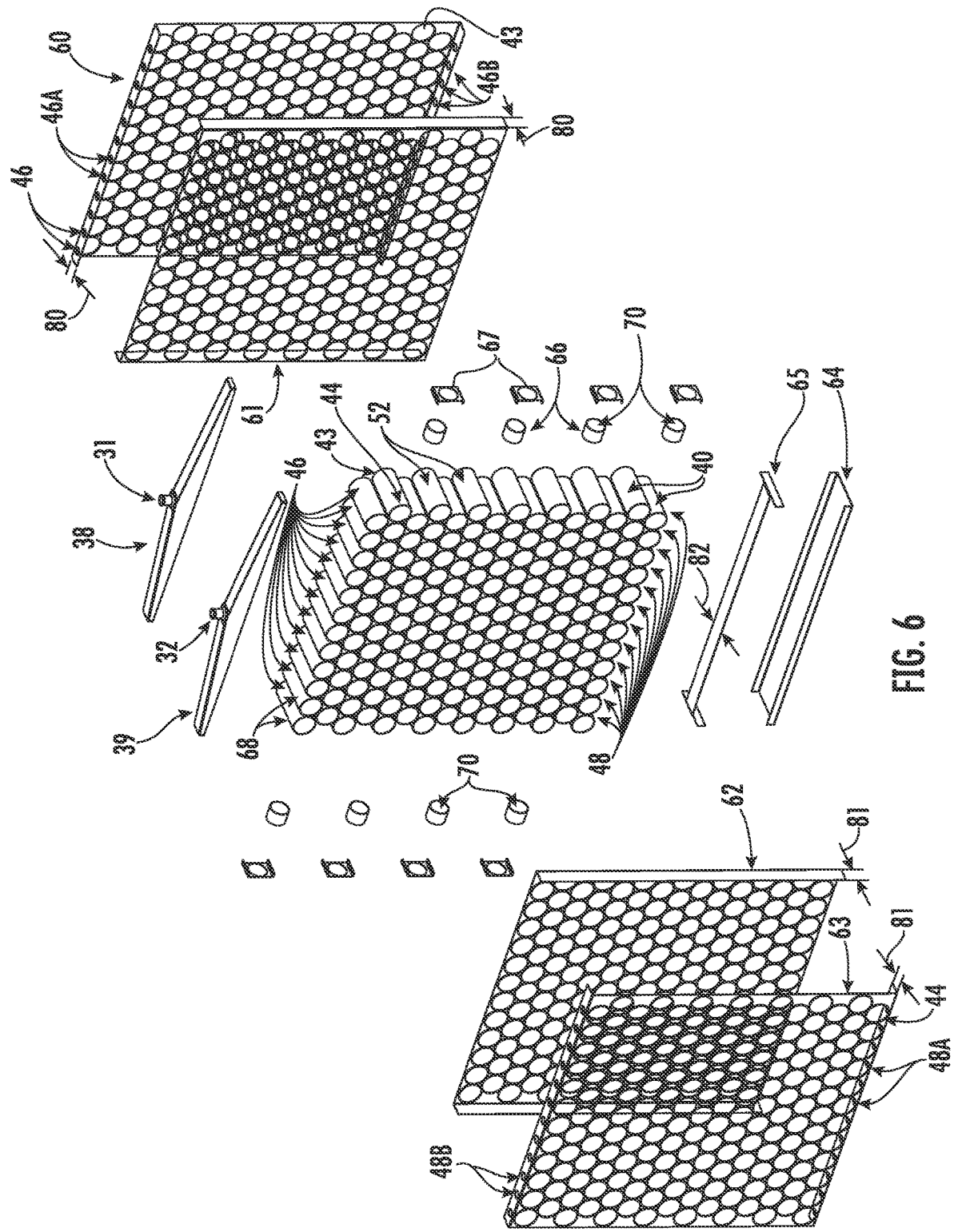
FIG. 6 is an exploded view of the cooling block shown in FIG. 5.
Figure 7:
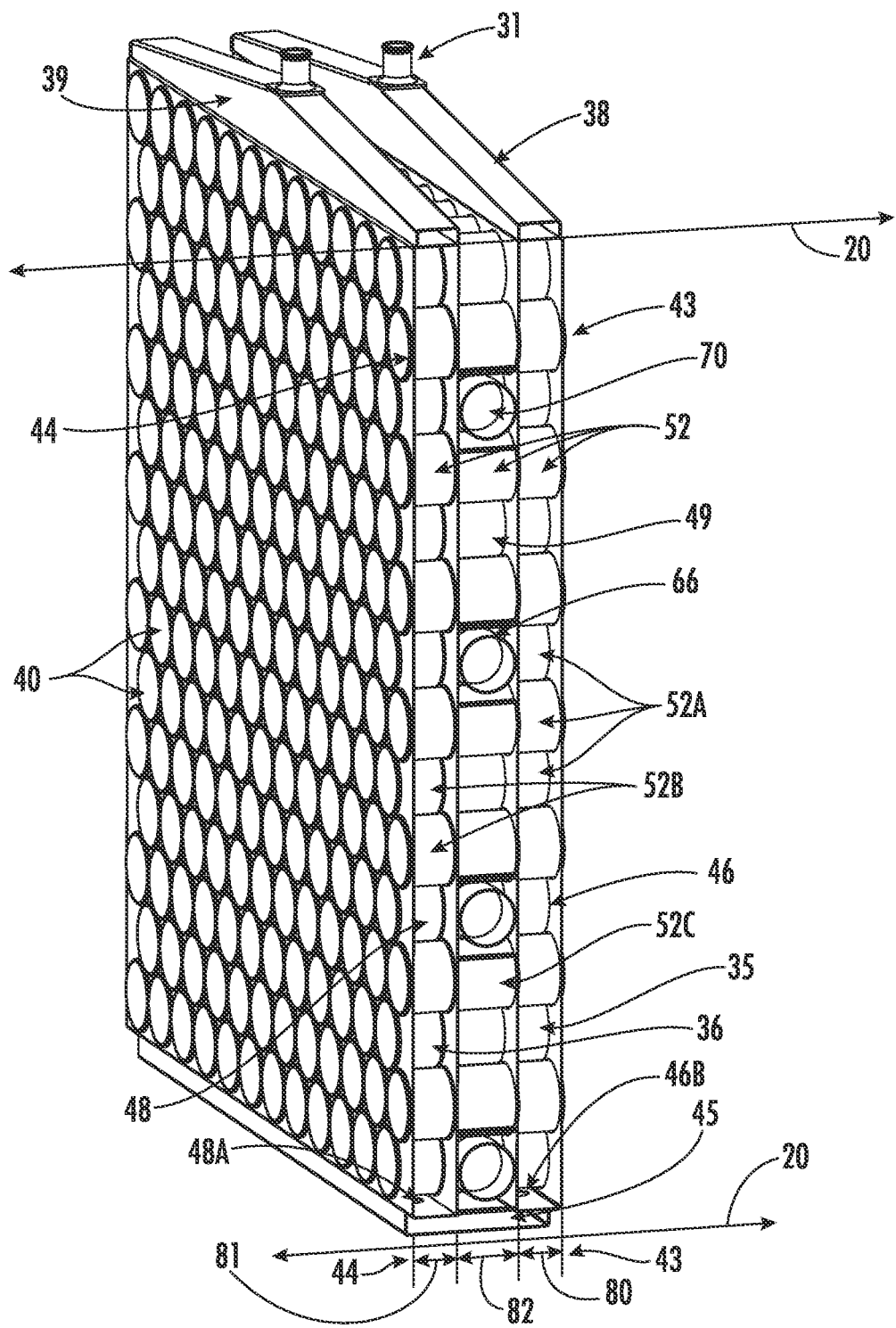
FIG. 7 is a right side partial cutaway perspective view of the cooling block shown in FIG. 5.

As shown in FIGS. 4-7, interior volume 33 of cooling block 30 generally comprises inlet 31, upper inlet manifold 38, lower cross-over manifold 45, a plurality of sub-channels 46 between upper inlet manifold 31 and lower cross-over manifold 45, upper outlet manifold 39, a plurality of sub-channels 48 between lower cross-over manifold 45 and upper outlet manifold 39, and outlet 32. As shown in FIG. 6, in this embodiment cooling block 30 is fabricated from brazed sheet metal parts to form interior volume 33. Such parts include a plurality of cylindrical tubes 68 stacked in rows 54 and columns 53 and having open ends 43 and 44 and inner cylindrical surfaces 51 and outer cylindrical surfaces 52 therebetween. Inner cylindrical surfaces 51 of tubes 68 define cell apertures 40 configured to receive cells 18. Such parts also include front face sheet 63, first chamber intermediate sheet 62, rear face sheet 60, second chamber intermediate sheet 61, upper manifold cover 38, upper manifold cover 39, lower manifold pan 64, lower manifold gap piece 65, mounting tubes 66, and mounting tube brackets 67. When placed around the rear portions 46 of tubes 68 and brazed together, the outer cylindrical surfaces 52 of portions 46 and sheets 60 and 61 form first interior flow chamber 35 having longitudinal width 80 and a plurality of transverse extending sub-channels 46. When placed around the front portions 48 of tubes 68 and brazed together, the outer cylindrical surfaces 52 of portions 48 and sheets 62 and 63 form second interior flow chamber 36 having longitudinal width 81 and a plurality of transverse extending sub-channels 48. The top edges of pan 64 are brazed to the bottom edges of sheets 60 and 63, respectively, the ends of piece 65 are brazed to the ends of pan 64, respectively, and the side edges of piece 65 are brazed to the bottom edges of sheets 61 and 62, respectively, to form lower cross-over manifold 45. The bottom edges of manifold cover 38 are brazed to the top edges of sheets 60 and 61 and the bottom edges of manifold cover 39 are brazed to the top edges of sheets 62 and 63. As shown, the top horizontal flange of sheet 60 includes a plurality of laterally spaced openings that form inlets from manifold 38 to coolant sub-channels 46 and the bottom horizontal flange of sheet 60 includes a plurality of corresponding laterally spaced openings that form outlets from coolant sub-channels 46 into manifold 45. Similarly, on the front side, the bottom horizontal flange of sheet 63 includes a plurality of laterally spaced openings that form inlets from manifold 45 to coolant sub-channels 48 and the top horizontal flange of sheet 63 includes a plurality of corresponding laterally spaced openings that form outlets from coolant sub-channels 48 into manifold 39. As shown, longitudinally spaced and parallel intermediate sheets 61 and 62 thereby split cooling block 30 into parallel flow chambers 35 and 36 that are separated by exterior gap 49 having longitudinal width 82. Sub-channels 46 and sub-channels 48 thereby extend transversely 22 parallel to each other.

As shown in FIG. 5, tubes 68 are stacked transversely in a predetermined pattern. In this embodiment, tubes 68 are spaced laterally and transversely to form a pattern of columns 53 and rows 54 of tubes that are staggered or offset laterally by offset 55. Thus, cell apertures 40 are arranged in a predetermined pattern of laterally 21 spaced columns 53 and transversely 22 spaced rows 54 of cell apertures 40, with cell apertures 40 in the laterally spaced columns 53 laterally offset 55 from the cell apertures in the transversely spaced rows 54. Offset 55 may be slightly greater than one-half of the diameter of tube 68 forming aperture 40 with a desired separation between tubes 68 so as to provide the desired sub-channel dimensions. Thus, sub-channels 46 and 48 weave transversely between adjacent columns 53 of tubes 68, with sub-channels 46 and 48 following the semi-circular circumferential contour of alternating outer surfaces 52 of tubes 68 of adjacent columns 53.

Figure 9:
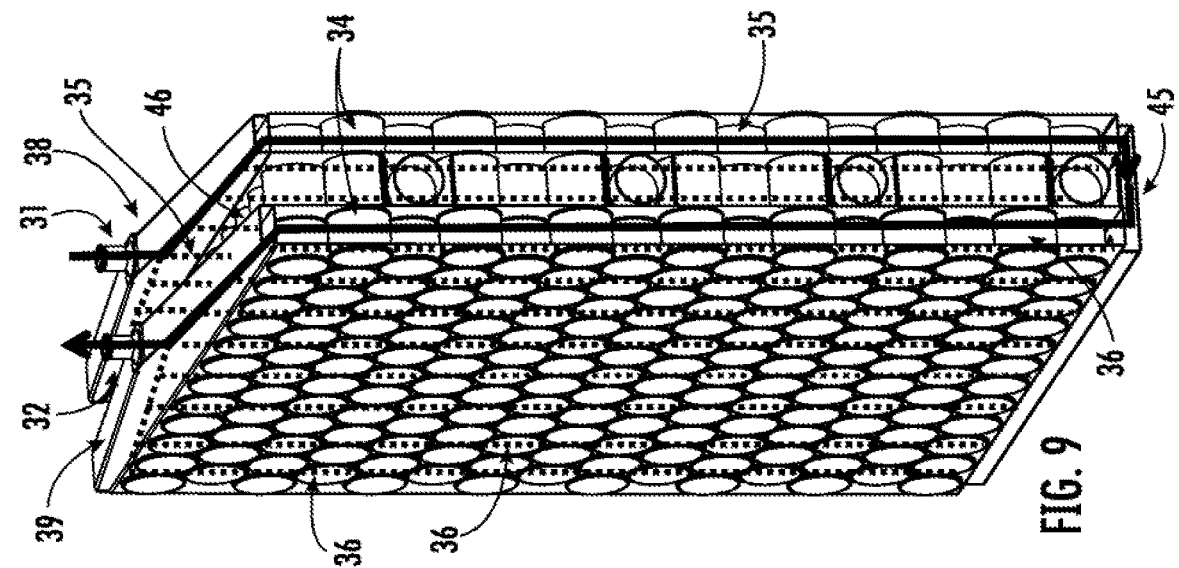
FIG. 9 is a schematic side perspective view of the cooling flow path shown in FIG. 7.
Figure 8:
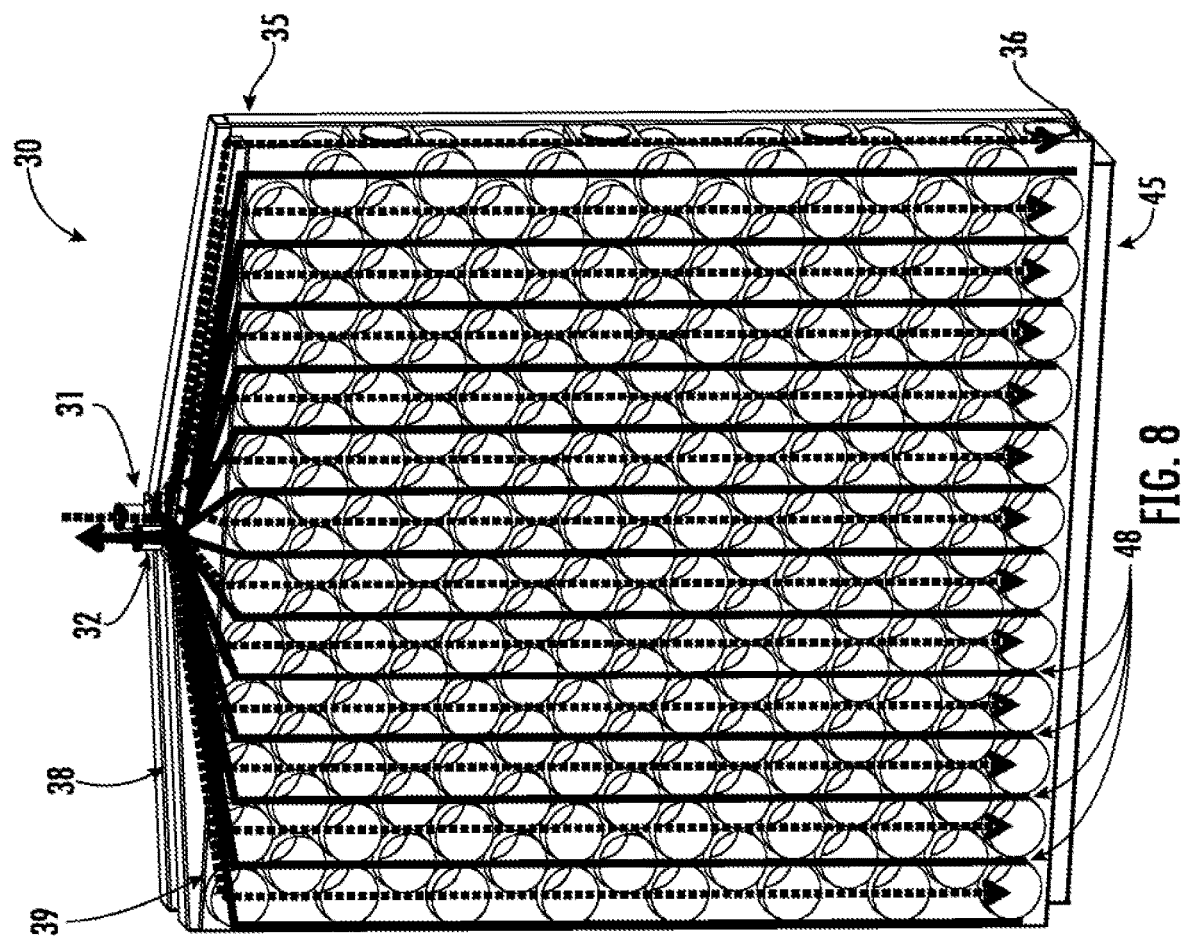
FIG. 8 is a schematic front perspective view of the cooling flow path for the cooling block shown in FIG. 5.
Figure 10:
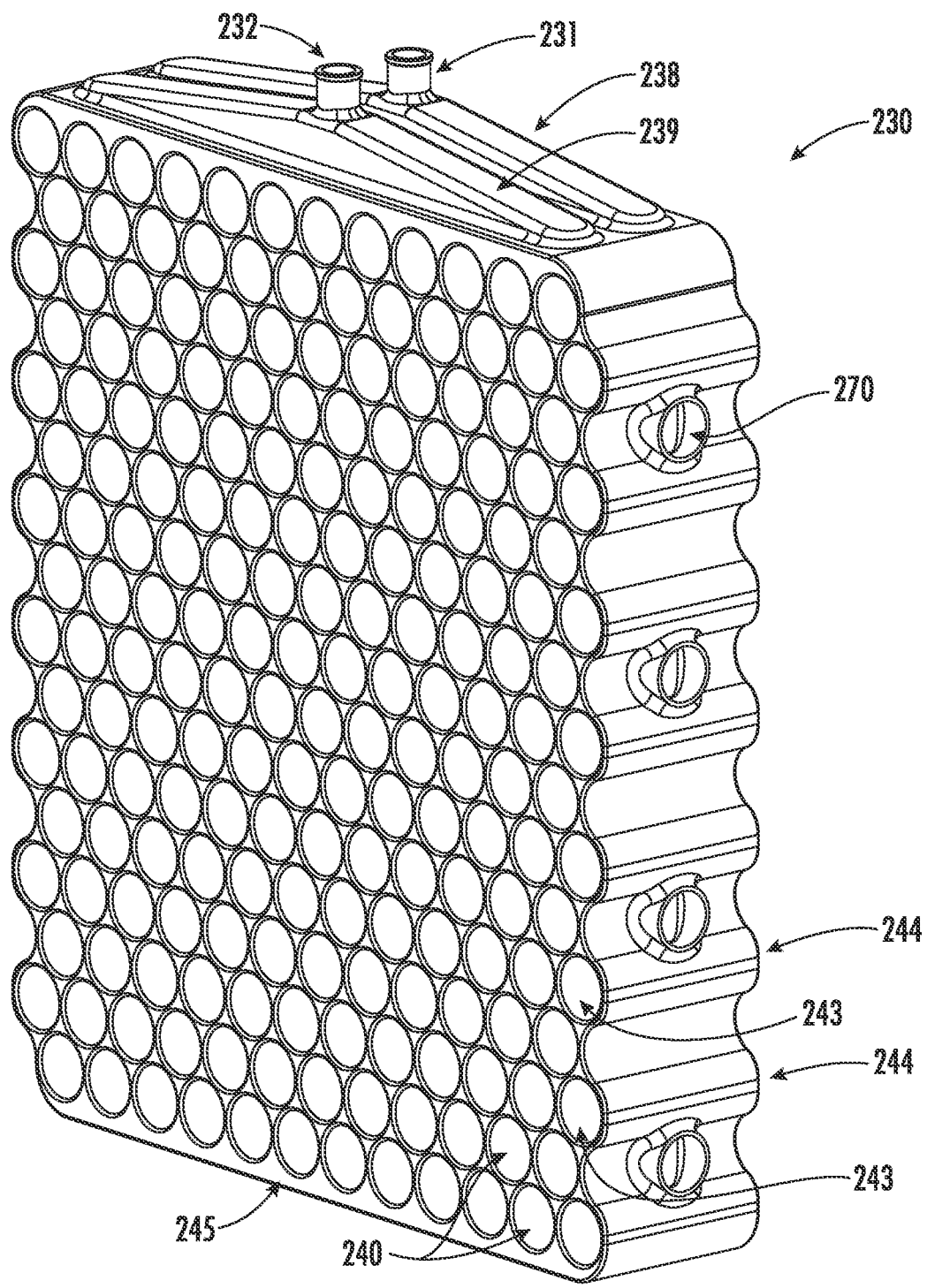
FIG. 10 is a front perspective view of a second embodiment of the cooling block shown in FIG. 5.
Figure 11:
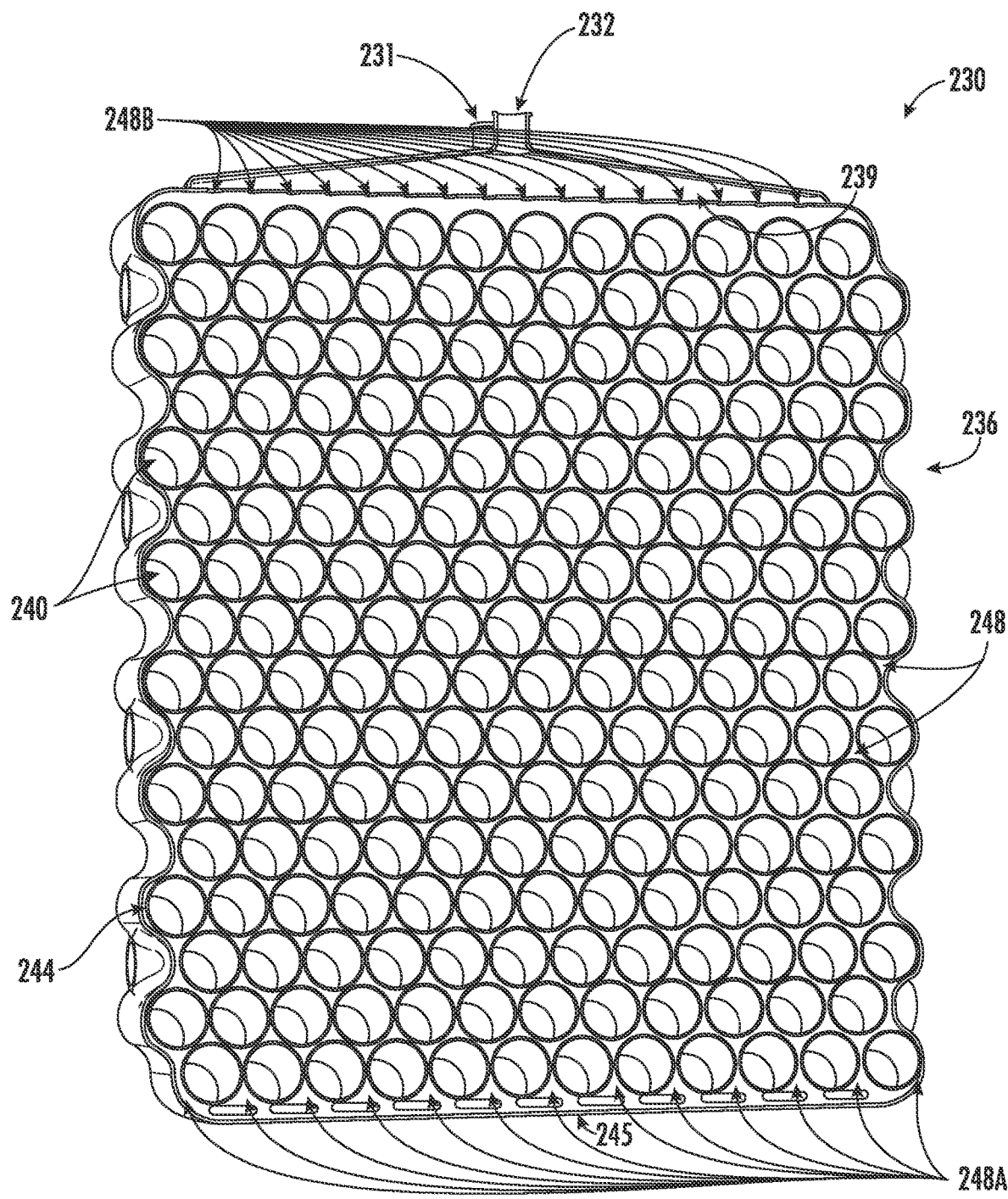
FIG. 11 is a front vertical lateral sectional and perspective view of the cooling block shown in FIG. 9.
Figure 12:
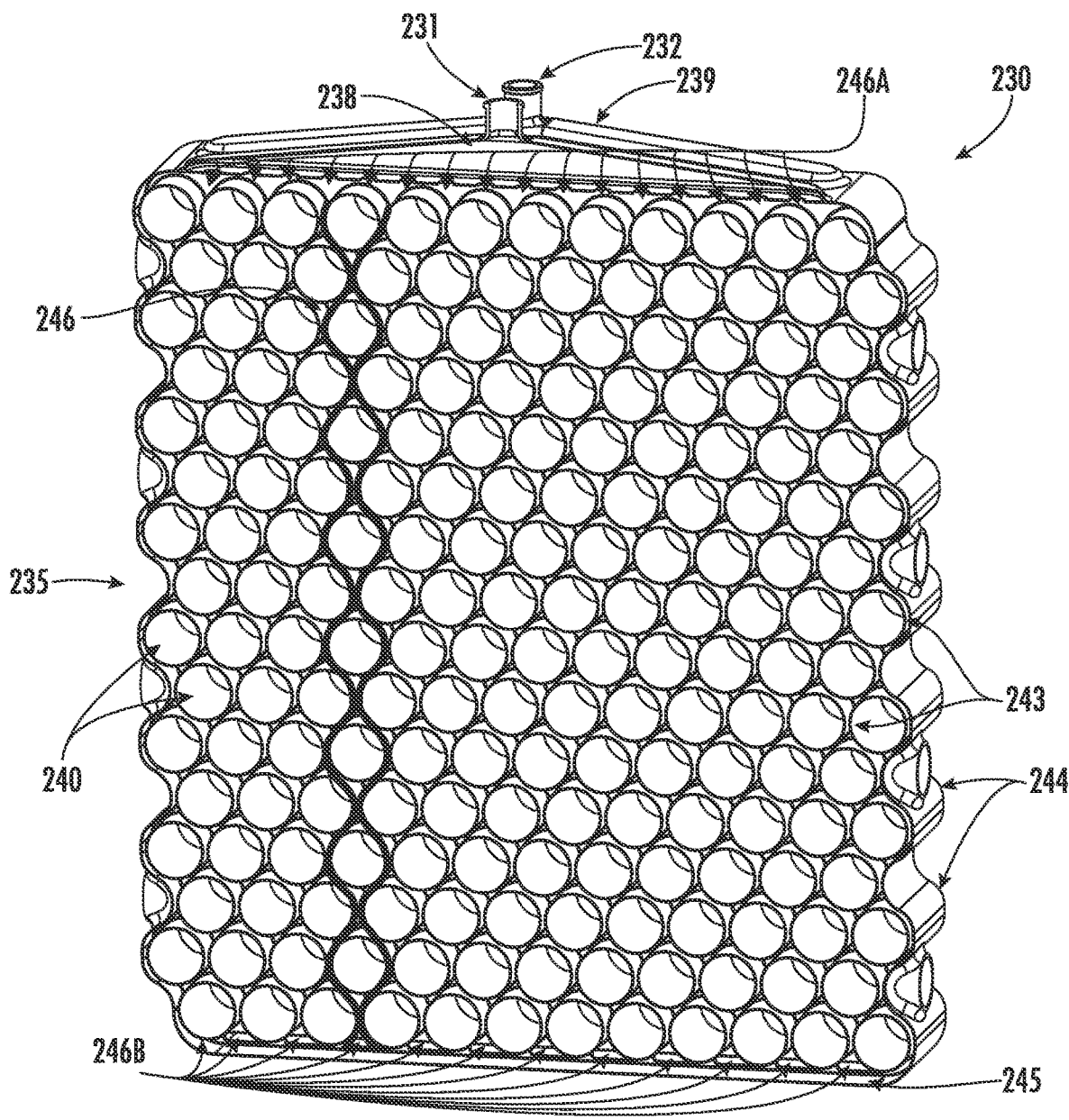
FIG. 12 is a rear vertical lateral sectional and perspective view of the cooling block shown in FIG. 10.
Figure 13:
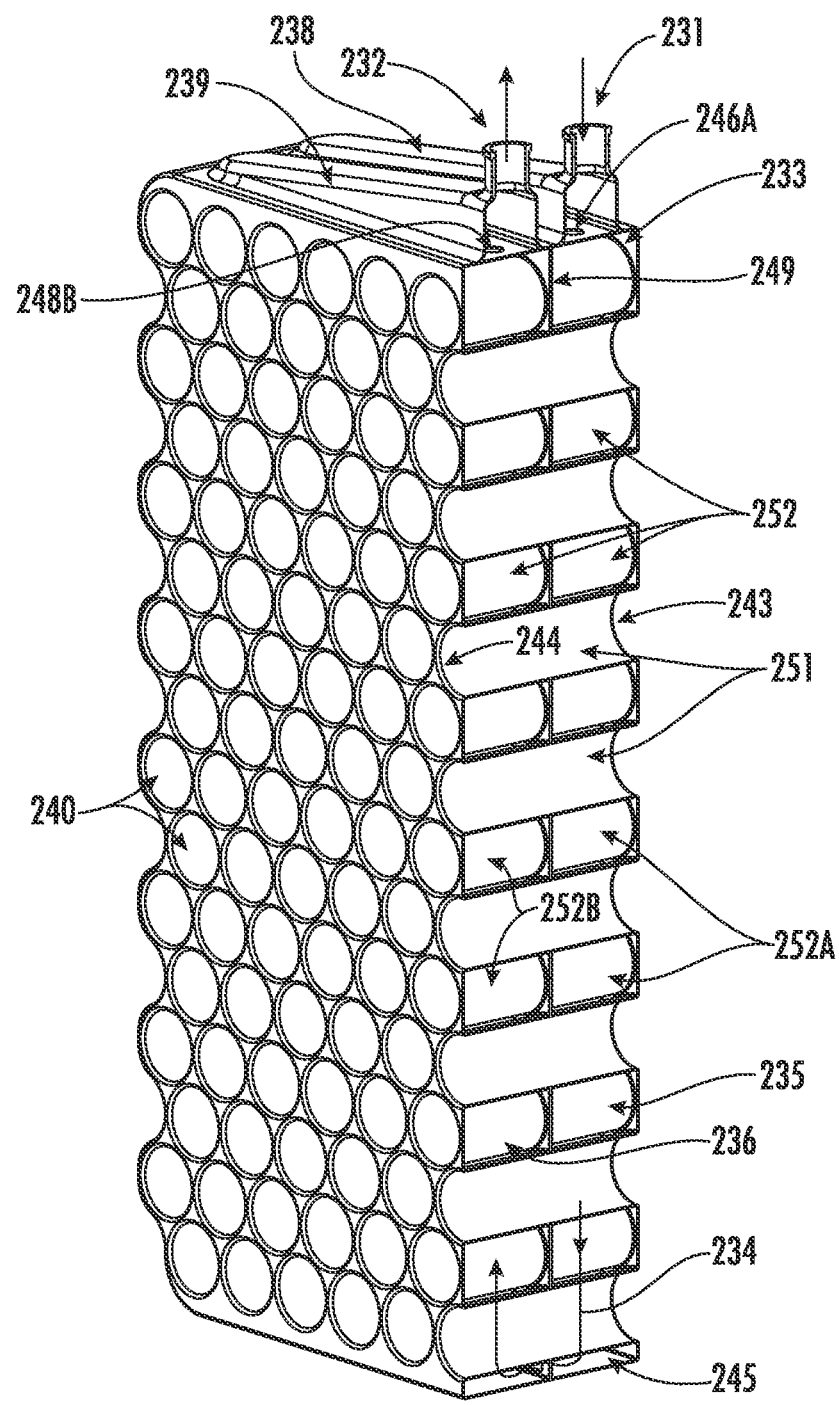
FIG. 13 is a front side vertical longitudinal sectional and perspective view of the cooling block shown in FIG. 9.
Figure 14:
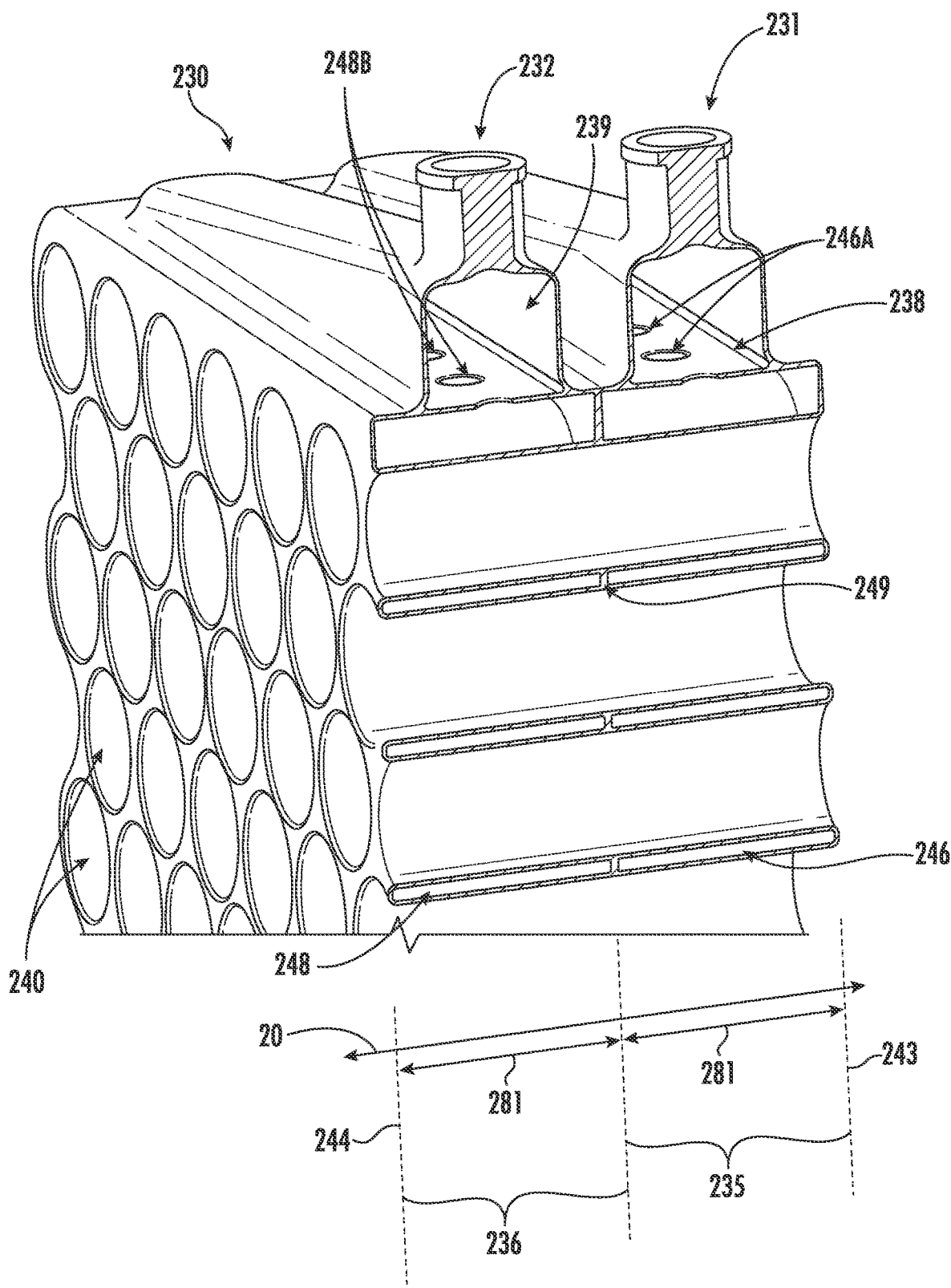
FIG. 14 is a partial enlarged view of the cooling block shown in FIG. 12.

As shown in FIGS. 8 and 9, coolant is supplied via exterior port 23 and one or more circulation pumps to inlet 31 of cooling block 30 and into manifold 38. Coolant is then directed through the plurality of upper rear openings 46A in the bottom of manifold 31 so as to disperse the coolant laterally as it enters flow chamber 35 such that it is then directed to flow transversely down around the outside surfaces 52 of longitudinal portions 52A of each of tubes 68 in columns 53 through sub-channels 46 between surfaces 52A of tubes 68, thereby cooling in a first downward thermal pass cells 18 in cell apertures 40. Coolant then exits flow chamber 35 through the rear lower row of openings 46B into lower manifold 45, where the coolant is directed longitudinally from the rear to the front. The coolant is then directed out of manifold 45 through the front lower row of openings 48A in manifold 45 so as to disperse the coolant laterally as it enters flow chamber 36 such that it is then directed to flow transversely up around the outside surfaces 52 of longitudinal portions 52B of each of tubes 68 in columns 53 through sub-channels 48 between surfaces 52B of tubes 68, thereby again cooling in a second upward thermal pass cells 18 in cell apertures 40. Coolant then exits flow chamber 36 through front upper row of openings 48B into manifold 39, where the coolant is then directed out through outlet 32 and port 24. Sub-channels 46 and 48 curve around each side of tubes 68 and cell apertures 40 in laterally spaced columns 53. Accordingly, cooling block 30 receives coolant through inlet 31 and discharges coolant though outlet 32. Interior coolant flow path 34 extends between inlet 31 and outlet 32 within interior volume 33. Cell apertures 40 are arranged laterally 21 and transversely 22 in cooling block 30 exterior to manifolds 38, 39 and 45, flow chambers 35 and 36, and interior coolant flow path 34. Each of the plurality of cell apertures 40 is configured to receive a battery cell 18 and they extend longitudinally 20 in cooling block 30 from aperture end 43 to aperture end 44. Manifold 38 receives coolant from inlet 31 and directs the coolant through openings 46A into multiple laterally spaced sub-channels 46 in cooling chamber 35 within interior coolant flow path 34. Manifold 45 receives coolant though openings 46B from sub-channels 46 in flow chamber 35 and directs the coolant longitudinally and then up through openings 48A into multiple laterally spaced sub-channels 48 in cooling chamber 36. Sub-channels 46 extending transversely between cell apertures 40 and are aligned longitudinally between aperture ends 43 and 44 so as to have a longitudinal width 80 from end 43 of cell apertures 40. Sub-channels 48 extending transversely between cell apertures 40 and are aligned longitudinally between sub-channels 46 and aperture ends 44 so as to have a longitudinal width 81 from end 44 of cell apertures 40. Sub-channels 46 provide a first thermal pass by each of cell apertures 18. Sub-channels 48 provide a second thermal pass by each of the same cell apertures 40 for temperature control of cells 18 during operation of the aerial vehicle. Cooling chambers 35 and 36 are separate chambers and are orientated such that the flow of coolant through chamber 36 is parallel to the flow of coolant through chamber 35 but in the opposite direction to the flow of coolant through chamber 35. Transversely extending gap 49 is aligned longitudinally between sub-channels 46 in cooling chamber 35 and sub-channels 48 in cooling chamber 36.

Cooling block 30 is mounted in housing 16 via a plurality of cylindrical holes 70 on the left and right sides of cooling block 30 and a plurality of mounting posts 71 on the left and right side panels 16C and 16D of housing 16, with support recesses 70 configured to receive support posts 71. Cooling block 30 is held in place by elastomeric isolators 72 that are anchored directly around the chassis mounting bosses or posts 71 of housing 16. Thus, cooling block 30 is supported by housing enclosure 16 via vibration dampening supports 70, 71, 72. The left support recesses, posts and isolators may be indicated at 70A, 71A and 72A and the right recesses, posts and isolators may be indicated at 70B, 71B and 72B.

Cooling block 130 is configured substantially the same as cooling block 30 and is stacked back-to-back longitudinally behind cooling block 30 with reference to FIG. 1. Thus, cooling block 130 comprises inlet 131 for receiving the coolant via inlet port 23, outlet 132 for discharging the coolant via outlet port 24, and an interior coolant flow path between inlet 131 and outlet 132. The interior volume of cooling block 130 generally comprises inlet 131, upper inlet manifold 138, lower cross-over manifold 145, a plurality of sub-channels 146 between upper inlet manifold 131 and lower cross-over manifold 145, upper outlet manifold 139, a plurality of sub-channels 148 between lower cross-over manifold 145 and upper outlet manifold 139, and outlet 132. Inner cylindrical surfaces of tubes 68 define cell apertures 140 configured to receive cells 118. Cooling block 130 is split into parallel flow chambers 135 and 136 that are separated by exterior gap 149 having longitudinal width 82. Sub-channels 146 and sub-channels 148 thereby extend transversely 22 parallel to each other. Coolant is supplied via exterior port 23 to inlet 131 of cooling block 130 and into manifold 138. Coolant is then directed through a plurality of upper front openings in the bottom of manifold 131 so as to disperse the coolant laterally as it enters flow chamber 135 such that it is then directed to flow transversely down around the outside surfaces of longitudinal portions 52A of each of tubes 68 in columns 53 through sub-channels 146 between surfaces 52A of tubes 68, thereby cooling in a first downward thermal pass cells 118 in cell apertures 140. Coolant then exits flow chamber 135 through the front lower row of openings into lower manifold 145, where the coolant is directed longitudinally from the front to the rear. The coolant is then directed out of manifold 145 through a rear lower row of openings in manifold 145 so as to disperse the coolant laterally as it enters flow chamber 136 such that it is then directed to flow transversely up around the outside surfaces 52 of longitudinal portions 52B of each of tubes 68 in columns 53 through sub-channels 148 between surfaces 52B of tubes 68, thereby again cooling in a second upward thermal pass cells 118 in cell apertures 140. Coolant then exits flow chamber 136 through a rear upper row of openings into manifold 139, where the coolant is then directed out through outlet 132 and port 24. Sub-channels 146 and 148 curve around each side of tubes 68 and cell apertures 140 in laterally spaced columns 53. Accordingly, cooling block 130 receives coolant through inlet 131 and discharges coolant though outlet 132.

Cooling block 130 is also mounted in housing 16 via a plurality of cylindrical holes 70 on the left and right sides of cooling block 130 and a plurality of mounting posts 71 on the left and right side panels 16C and 16D of housing 16, with support recesses 70 configured to receive support posts 71. Cooling block 130 is held in place by elastomeric isolators 72 that are anchored directly around the chassis mounting bosses or posts 71 of housing 16. Thus, cooling block 130 is supported by housing enclosure 16 via vibration dampening supports 70, 71, 72.

In this embodiment, cooling chamber 135 and sub-channels 146 of cooling block 130 is positioned longitudinally between cooling chamber 35 and sub-channels 46 of cooling block 30 and cooling chamber 136 and sub-channels 148 of cooling block 130. Thus, the initial cooling chambers 35 and 135 of cooling blocks 30 and 130, respectively, are positioned interior to the secondary cooling chambers 36 and 136 of cooling blocks 30 and 130, respectively. Thus, secondary cooling chambers 36 and 136 of cooling blocks 30 and 130, respectively, are positioned on the outside of assembly 15.

As shown, thermal insulation layer 73 is disposed longitudinally between cooling block 30 and cooling block 130. This self-extinguishing separator panel is installed between cooling blocks 30 and 130 to prevent any hot gases jetting from a cell in one cooling block from impinging directly onto cells in the neighboring cooling block. In addition, cells may be isolated from their cooling block by a combination of heat shrink wrap and insulating coatings on the cooling block if the selected material is electrically conductive. In addition, prior to installation the assembled cooling blocks will be wrapped in an insulation paper.

Figure 15:
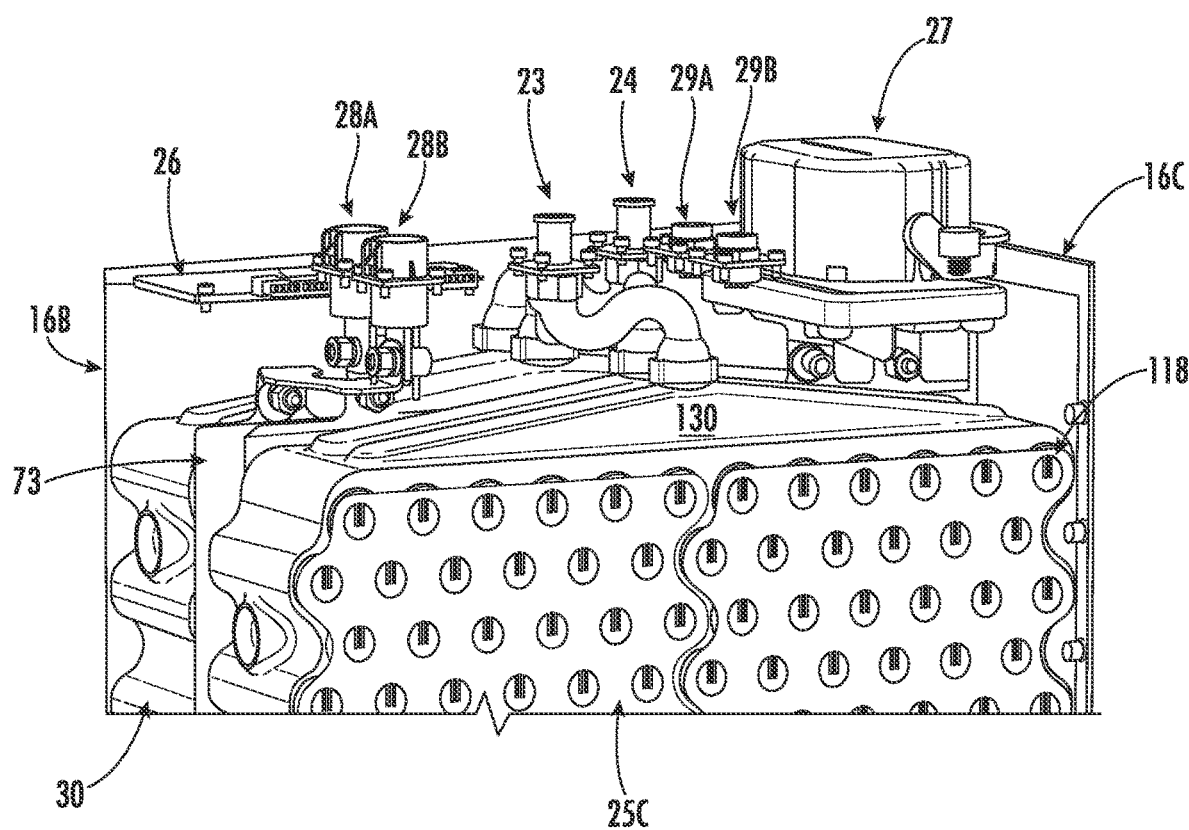
FIG. 15 is a partial rear perspective view of the assembly shown in FIG. 1 with the cooling block embodiment shown in FIG. 10.
Figure 16:
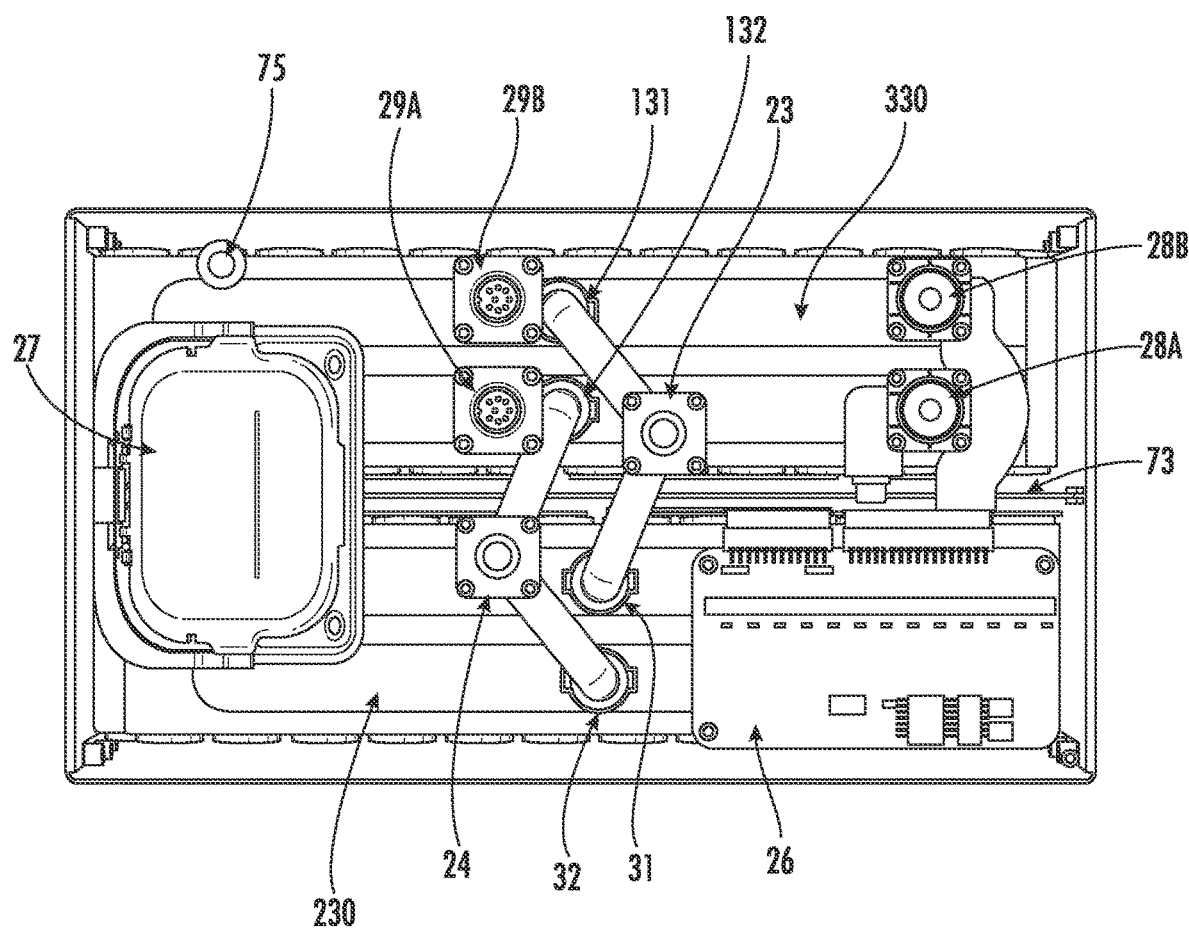
FIG. 16 is a top perspective view of the assembly shown in FIG. 15.
Figure 17:
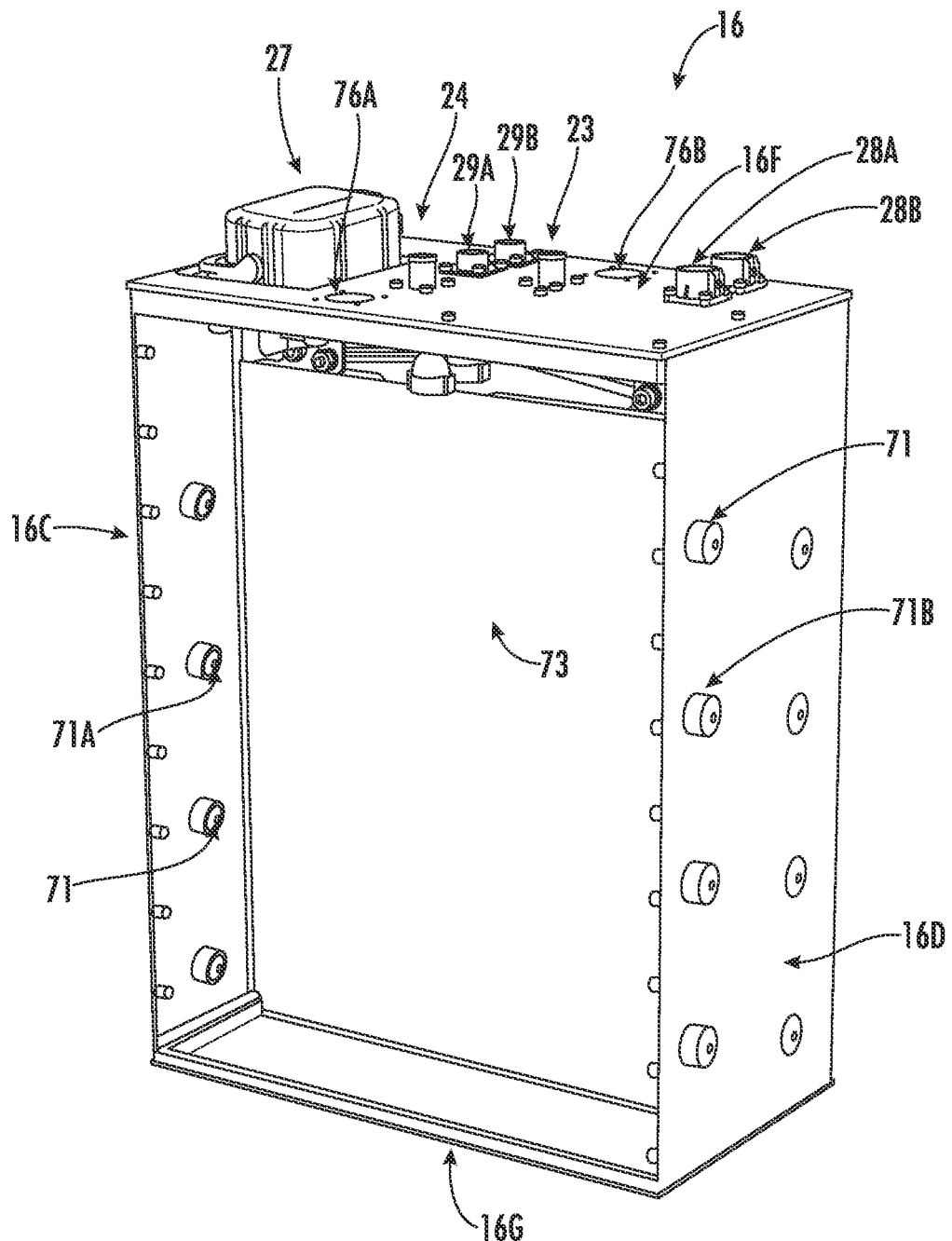
FIG. 17 front perspective view of the assembly shown in FIG. 1 with the front cooling block removed.

As shown in FIGS. 15 and 16, a Y-hose connects inlets 31 and 131 on cooling blocks 30 and 130, respectively, to external inlet cooling port 23 in a parallel flow arrangement and a Y-hose connects outlets 32 and 132 on cooling blocks 30 and 130, respectively, to external outlet cooling port 24 in a parallel flow arrangement.

In this embodiment, coolant blocks 30 and 130 are each designed to cool one hundred eighty cylindrical cells 18. Thus, module 15 contains 360 cells, arranged in a 30 series, 12 parallel arrangement. However, the coolant blocks are not limited to a specific number of apertures and cells, or even a specific arrangement of apertures and cells. In addition, while in this embodiment apertures 40 and 140 and cells 18 and 118 are cylindrical, the coolant blocks may be configured to cool cells having other shapes or profiles.

FIGS. 10-16 show a second embodiment 230 of a cooling block. Coolant block 230 is substantially the same as coolant blocks 30 and 130. However, rather than being formed of brazed sheet metal, coolant block 230 is formed by additive manufacturing and comprises a unitary formed block. In addition, cooling block 230 includes a thinner longitudinal separator 249 rather than a wide laterally extending longitudinal gap 49.

As show, cooling block 230 is formed to also include inlet 231, upper inlet manifold 238, lower cross-over manifold 245, a plurality of sub-channels 246 between upper inlet manifold 231 and lower cross-over manifold 245, upper outlet manifold 239, a plurality of sub-channels 248 between lower cross-over manifold 245 and upper outlet manifold 239, and outlet 232. Cell apertures 240 are spaced laterally and transversely to form a pattern of columns and rows of apertures that are staggered or offset laterally. Thus, cell apertures 240 are arranged in a predetermined pattern of laterally 21 spaced columns and transversely 22 spaced rows of cell apertures 240, with the cell apertures in the laterally spaced columns laterally offset from the cell apertures in the transversely spaced rows. Coolant is supplied to inlet 231 of cooling block 230 and into manifold 238. Coolant is then directed through the plurality of upper rear openings 246A in the bottom of manifold 231 so as to disperse the coolant laterally as it enters flow chamber 235 such that it is then directed to flow transversely down around the outside surfaces 252 of longitudinal portions 252A of each of cell apertures 240 in each column through sub-channels 246, thereby cooling in a first downward thermal pass the cells in cell apertures 240. Coolant then exits flow chamber 235 through openings 246B into lower manifold 245, where the coolant is directed longitudinally from the rear to the front. The coolant is then directed out of manifold 245 through openings 248A in manifold 245 so as to disperse the coolant laterally as it enters flow chamber 236 such that it is then directed to flow transversely up around the outside surfaces 252 of longitudinal portions 252B of each of cell apertures 240 in each column through sub-channels 248, thereby again cooling in a second upward thermal pass the cells in cell apertures 240. Coolant then exits flow chamber 236 through front upper row of openings 248B into manifold 239, where the coolant is then directed out through outlet 232. Sub-channels 246 and 248 curve around each side of cell apertures 240 in the laterally spaced columns. Accordingly, interior coolant flow path 234 extends between inlet 231 and outlet 232. Cell apertures 240 are arranged laterally 21 and transversely 22 in cooling block 230 exterior to manifolds 238, 239 and 245, flow chambers 235 and 236, and interior coolant flow path 234. Each of the plurality of cell apertures 240 is configured to receive a battery cell and they extend longitudinally 20 in cooling block 230 from aperture end 243 to aperture end 244. Manifold 238 receives coolant from inlet 231 and directs the coolant through openings 246A into multiple laterally spaced sub-channels 246 in cooling chamber 235 within interior coolant flow path 234. Manifold 245 receive coolant though openings 246B from sub-channels 246 in flow chamber 235 and directs the coolant longitudinally and then up through openings 248A into multiple laterally spaced sub-channels 248 in cooling chamber 236. Sub-channels 246 extending transversely between cell apertures 240 and are aligned longitudinally between aperture ends 243 and 244 so as to have a longitudinal width 280 from end 243 of cell apertures 240. Sub-channels 248 extending transversely between cell apertures 240 and are aligned longitudinally between sub-channels 246 and aperture ends 244 so as to have a longitudinal width 281 from end 244 of cell apertures 240. Sub-channels 246 provide a first thermal pass by each of cell apertures 240 and sub-channels 248 provide a second thermal pass by each of the same cell apertures 240 for temperature control of cells during operation of the vehicle. Cooling chambers 235 and 236 are separate chambers and are orientated such that the flow of coolant through chamber 236 is parallel to the flow of coolant through chamber 238 but in the opposite direction to the flow of coolant through chamber 238.

Battery pack assembly 15 provides numerous advantages. For example, the assembly helps prevent thermal runaway from spreading to other cells, mitigating major damage to the assembly and the vehicle. The cooling blocks help to minimize temperature rise of cells adjacent to the runaway cell by continuously circulating coolant around them. The interior volume and coolant flow path have an improved cooling geometry that reduces thermal resistant between the cooling circuit and the cells and provides a more even thermal gradient along the entire length of the coolant flow path among the cells. The fluid cooling channels within the assembly provide balanced heat transfer across all battery cells to or from the fluid medium. This balanced heat transfer provides thermal management for the cells during electrical discharging, charging, and adverse ambient temperature conditions, which extends their life. A significant air gap may also be provided around the venting caps of all cells, allowing hot gases to dissipate rather than heating up adjacent cells to the point of runaway. The self-extinguishing separator panel installed in between the two blocks of cells prevents hot gases jetting from a cell in one block from impinging directly onto cells in the neighboring block. The mass of the coolant blocks as well as the coolant fluid provide a significant thermal mass to absorb heat in the case of a cell thermal runaway, which is an effective means to prevent propagation of thermal runaway to adjacent battery cells. The assembly's built-in mounting pockets that house elastomeric vibration isolators effectively spread acceleration and vibration loads evenly across the structure. The assembly provides improved cooling and thermal runaway propagation mitigation in a lighter-weight structure for use in aerial and other transportation applications, which improves vehicle performance, dynamic stability, range, endurance, efficiency, and useful life.

The terms "battery cell", "battery," and "cell" may be used interchangeably. A battery cell, battery or cell may refer to any of a number of different alternative rechargeable cell chemistries and configurations, including without limitation lithium-ion, nickel cadmium, nickel zinc, polymers, hybrids or other types and configurations. A "battery pack" may refer to any of a number of different alternatives having multiple cells contained within a body or housing and electrically interconnected to achieve the desired capacity and voltage.

The present disclosure contemplates that many changes and modifications may be made. Therefore, while forms of an improved battery pack module have been shown and described, and a number of alternatives discussed, persons skilled in this art will readily appreciate that various additional changes and modifications may be made without departing from the scope of the invention, as defined and differentiated by the following claims.

What is claimed is:

1. A battery cell cooling assembly for vehicle comprising:
   a cooling vessel having an interior volume and comprising an inlet for receiving a coolant, an outlet for discharging said coolant, and an interior coolant flow path between said inlet and said outlet within said interior volume;
   a plurality of cell apertures arranged laterally and transversely in said cooling vessel exterior to said interior coolant flow path;
   each of said plurality of cell apertures configured to receive a battery cell and extending longitudinally in said cooling vessel from a first aperture end to a second aperture end;
   a first coolant directional in said interior coolant flow path between said inlet and said outlet that is configured to receive coolant from said inlet and to direct said coolant into multiple laterally spaced and interconnected first sub-channels within said interior coolant flow path;
   a second coolant directional in said interior coolant flow path between said first coolant directional and said outlet and configured to receive coolant from said first sub-channels and to direct said coolant into multiple laterally spaced and interconnected second sub-channels within said interior coolant flow path;
   said first sub-channels extending transversely between said plurality of cell apertures and aligned longitudinally between said first aperture ends and said second aperture ends of said plurality of cell apertures;
   said second sub-channels extending transversely between said plurality of cell apertures and aligned longitudinally between said first sub-channels and said second aperture ends;
   wherein said first sub-channels provide a first thermal pass by each of said plurality of cell apertures and said second sub-channels provide a second thermal pass by each of said same plurality of cell apertures for temperature control of the cells during operation of the vehicle.

2. The battery cell cooling assembly set forth in claim 1, comprising a transversely extending gap aligned longitudinally between said first sub-channels and said second sub-channels.

3. The battery cell cooling assembly set forth in claim 1, wherein said cooling vessel comprises a top side, a bottom side, a front side, a rear side, a left side and a right side.

4. The battery cell cooling assembly set forth in claim 3, wherein said inlet and said outlet are proximate said top side of said cooling vessel, said second coolant directional is proximate said bottom side of said cooling vessel, and said plurality of cell apertures extend between said front side and said rear side of said cooling vessel.

5. The battery cell cooling assembly set forth in claim 1, wherein each of said plurality of cell apertures comprises a tube having a cylindrical inner surface and a cylindrical outer surface.

6. The battery cell cooling assembly set forth in claim 5, wherein said plurality of first sub-channels are formed at least in part by first portions of said cylindrical outside surfaces of said tubes, and said plurality of second sub-channels are formed at least in part by second portions of said cylindrical outside surfaces of said tubes that are separate from said first portions of said cylindrical outside surfaces of said tubes.

7. The battery cell cooling assembly set forth in claim 6, wherein said first portions of said cylindrical outside surfaces of said tubes and said second portions of said cylindrical outside surfaces of said tubes define at least in part said interior volume of said cooling vessel.

8. The battery cell cooling assembly set forth in claim 1, comprising a housing enclosure and wherein said cooling vessel is supported by said housing enclosure via a vibration dampening support.

9. The battery cell cooling assembly set forth in claim 8, wherein:
    said cooling vessel comprises a left side and said housing enclosure comprises a left side panel opposed to said left side of said cooling vessel;
    either said left side of said cooling vessel or said left side panel of said housing enclosure comprises a first support post and the other of said left side of said cooling vessel or said left side panel of said housing enclosure comprises a first support recess configured to receive said first support post; and
    said vibration dampening support comprises a first vibration isolation member disposed between said first support post and said first support recess; and
    said cooling vessel is supported at least in part by said left side panel.

10. The battery cell cooling assembly set forth in claim 9, wherein:
    said cooling vessel comprises a right side and said housing enclosure comprises a right side panel opposed to said right side of said cooling vessel;
    either said right side of said cooling vessel or said right side panel of said housing enclosure comprises a second support post and the other of said right side of said cooling vessel or said right side panel of said housing enclosure comprises a second support recess configured to receive said second support post; and
    said vibration dampening support comprises a second vibration isolation member disposed between said second support post and said second support recess; and
    said cooling vessel is supported at least in part by said right side panel.

11. The battery cell cooling assembly set forth in claim 1, wherein said first sub-channels and said second sub-channel extend transversely parallel to each other.

12. The battery cell cooling assembly set forth in claim 1, wherein said plurality of cell apertures are arranged in a predetermined pattern of laterally spaced columns and transversely spaced rows of said cell apertures.

13. The battery cell cooling assembly set forth in claim 12, wherein said cell apertures in said laterally spaced columns are laterally offset from said cell apertures in said transversely spaced rows.

14. The battery cell cooling assembly set forth in claim 13, wherein said first sub-channels curve around said cell apertures in said laterally spaced columns.

15. The battery cell cooling assembly set forth in claim 1, comprising a third coolant directional in said interior coolant flow path between said second coolant directional and said outlet that is configured to receive coolant from said second sub-channels and to direct said coolant into said outlet.

16. The battery cell cooling assembly set forth in claim 15, comprising a thermal insulation layer between said cooling vessel and said second cooling vessel.

17. The battery cell cooling assembly set forth in claim 15, comprising a housing enclosure containing said cooling vessel and said second cooling vessel and wherein said cooling vessel and said second cooling vessel are each supported by said housing enclosure via a vibration dampening support.

18. The battery cell cooling assembly set forth in claim 15, wherein said fourth sub-channels are spaced longitudinally between said first sub-channels and said third sub-channels.

19. The battery cell cooling assembly set forth in claim 15, comprising:
    a fifth coolant directional in said interior coolant flow path between said second coolant directional and said outlet that is configured to receive coolant from said second sub-channels and to direct said coolant into said outlet; and
    a sixth coolant directional in said second interior coolant flow path between said fourth coolant directional and said second outlet that is configured to receive coolant from said fourth sub-channels and to direct said coolant into said second outlet.

20. The battery cell cooling assembly set forth in claim 19, comprising a system inlet in fluid communication with both said inlet of said cooling vessel and said second inlet of said second cooling vessel and a system outlet in fluid communication with both said outlet of said cooling vessel and said second outlet of said second cooling vessel.

21. The battery cell cooling assembly set forth in claim 1, comprising:
    a second cooling vessel having a second interior volume and comprising a second inlet for receiving said coolant, a second outlet for discharging said coolant, and a second interior coolant flow path between said second inlet and said second outlet within said second interior volume;
    a second plurality of cell apertures arranged laterally and transversely in said second cooling vessel exterior to said second interior coolant flow path;
    each of said second plurality of cell apertures configured to receive a battery cell and extending longitudinally in said second cooling vessel from a third aperture end to a fourth aperture end;
    a third coolant directional in said second interior coolant flow path between said second inlet and said second outlet that is configured to receive coolant from said second inlet and to direct said coolant into multiple laterally spaced and interconnected third sub-channels within said second interior coolant flow path;
    a fourth coolant directional in said second interior coolant flow path between said third coolant directional and said second outlet and configured to receive coolant from said third sub-channels and to direct said coolant into multiple laterally spaced and interconnected fourth sub-channels within said second interior coolant flow path;
    said third sub-channels extending transversely between said second plurality of cell apertures and aligned longitudinally between said third aperture ends and said fourth aperture ends of said second plurality of cell apertures;
    said fourth sub-channels extending transversely between said second plurality of cell apertures and aligned longitudinally between said third sub-channels and said fourth aperture ends;
    wherein said third sub-channels provide a first thermal pass by each of said second plurality of cell apertures and said fourth sub-channels provide a second thermal pass by each of said same second plurality of cell apertures.

* * * * *